United States Patent
Kaplan et al.

(10) Patent No.: US 11,467,992 B1
(45) Date of Patent: Oct. 11, 2022

(54) MEMORY ACCESS OPERATION IN DISTRIBUTED COMPUTING SYSTEM

(71) Applicant: Amazon Technologies, inc., Seattle, WA (US)

(72) Inventors: Patricio Kaplan, Palo Alto, CA (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/031,668

(22) Filed: Sep. 24, 2020

(51) Int. Cl.
*G06F 3/06* (2006.01)
*G06F 13/28* (2006.01)

(52) U.S. Cl.
CPC ............ *G06F 13/28* (2013.01); *G06F 3/0604* (2013.01); *G06F 3/0655* (2013.01); *G06F 3/0673* (2013.01); *G06F 2213/0026* (2013.01); *G06F 2213/28* (2013.01)

(58) Field of Classification Search
None
See application file for complete search history.

(56) References Cited

U.S. PATENT DOCUMENTS

| | | | | |
|---|---|---|---|---|
| 6,115,747 | A * | 9/2000 | Billings | H04L 12/44 709/231 |
| 7,260,615 | B2 * | 8/2007 | Hooks | G06F 9/4862 709/200 |
| 7,286,548 | B1 | 10/2007 | Jair et al. | |
| 10,949,365 | B2 | 3/2021 | Jacobs et al. | |
| 2004/0010612 | A1 | 1/2004 | Pandya | |
| 2004/0093411 | A1 | 5/2004 | Elzur et al. | |
| 2005/0177537 | A1 * | 8/2005 | Thompson | G06F 9/546 |
| 2006/0020637 | A1 * | 1/2006 | Kedem | G06F 16/10 |
| 2006/0136570 | A1 | 6/2006 | Pandya | |
| 2006/0236063 | A1 | 10/2006 | Hausauer et al. | |
| 2006/0256784 | A1 | 11/2006 | Feng et al. | |
| 2006/0259661 | A1 | 11/2006 | Feng et al. | |
| 2009/0077567 | A1 | 3/2009 | Craddock et al. | |
| 2009/0254647 | A1 | 10/2009 | Elzur et al. | |
| 2013/0198538 | A1 | 8/2013 | Diab et al. | |
| 2015/0039712 | A1 | 2/2015 | Frank et al. | |
| 2015/0088483 | A1 | 3/2015 | Aarts et al. | |
| 2015/0281649 | A1 * | 10/2015 | Ehmann | G06F 3/0488 348/14.07 |

(Continued)

OTHER PUBLICATIONS

U.S. Appl. No. 17/031,653, filed Sep. 24, 2020, Titled: Data Synchronization Operation At Distributed Computing System.

(Continued)

*Primary Examiner* — Elias Mamo
(74) *Attorney, Agent, or Firm* — Kilpatrick Townsend & Stockton LLP

(57) ABSTRACT

In one example, an apparatus comprises: a local on-chip memory; a computation engine configured to generate local data and to store the local data at the local on-chip memory; and a controller. The apparatus is configured to be coupled with a second device via an interconnect, the second device comprising a local memory. The controller is configured to: fetch the local data from the local on-chip memory; fetch remote data generated by another device from a local off-chip memory; generate output data based on combining the local data and the remote data; and store, via the interconnect, the output data at the local memory of the second device.

20 Claims, 23 Drawing Sheets

(56) References Cited

U.S. PATENT DOCUMENTS

| | | | |
|---|---|---|---|
| 2017/0187621 | A1 | 6/2017 | Shalev et al. |
| 2017/0346596 | A1 | 11/2017 | Desimone et al. |
| 2018/0102978 | A1 | 4/2018 | Shen et al. |
| 2018/0287869 | A1 | 10/2018 | Munafo et al. |
| 2019/0171612 | A1 | 6/2019 | Shahar et al. |
| 2019/0303297 | A1 | 10/2019 | Fleming, Jr. et al. |
| 2019/0347125 | A1 | 11/2019 | Sankaran et al. |
| 2019/0392297 | A1 | 12/2019 | Lau et al. |
| 2020/0151104 | A1 | 5/2020 | Yang |
| 2020/0174840 | A1 | 6/2020 | Zhao et al. |
| 2020/0178198 | A1 | 6/2020 | Ding et al. |
| 2020/0242258 | A1 | 7/2020 | Smith et al. |
| 2020/0314181 | A1 * | 10/2020 | Eran .................. G06F 13/28 |
| 2020/0334195 | A1 | 10/2020 | Chen et al. |
| 2021/0076275 | A1 | 3/2021 | Yiu et al. |
| 2021/0117360 | A1 | 4/2021 | Kutch et al. |
| 2021/0149441 | A1 | 5/2021 | Bartscherer et al. |
| 2021/0342188 | A1 * | 11/2021 | Novakovic ........... G06F 12/10 |

OTHER PUBLICATIONS

U.S. Appl. No. 17/038,623, filed Sep. 30, 2020, Titled: Control Plane Operation At Distributed Computing System.

Daoud et al., "Asynchronous Peer-to-Peer Device Communication", OpenFabrics Alliance 13th Annual Workshop, Mar. 28, 2017, 26 pages.

* cited by examiner

US 11,467,992 B1

MEMORY ACCESS OPERATION IN DISTRIBUTED COMPUTING SYSTEM

BACKGROUND

A distributed computing system typically includes a cluster of inter-networked computing devices, in which each computing device can communicate and exchange data with each other to support a computation operation. Through parallelism, a distributed computing system can substantially reduce the time needed to complete the computation operation, especially a computation operation that operates on a large volume of data. Specifically, the computation operation can be split into multiple sub-operations, with each sub-operation operating on a subset of the data. Each computing device can receive a subset of the data from the network, and perform the sub-operation on the subset of the data in parallel to generate the output. As a result of the parallel processing, the time required to complete the computation operation can be substantially reduced compared with a case where the sub-operations are performed sequentially at a single computing device, which can lead to a substantial performance improvement. However, the performance improvement brought about by a distributed computing system can diminish due to various internal latencies at the computing device.

BRIEF DESCRIPTION OF THE DRAWINGS

Various embodiments in accordance with the present disclosure will be described with reference to the drawings, in which.

DETAILED DESCRIPTION

Figure 1A:
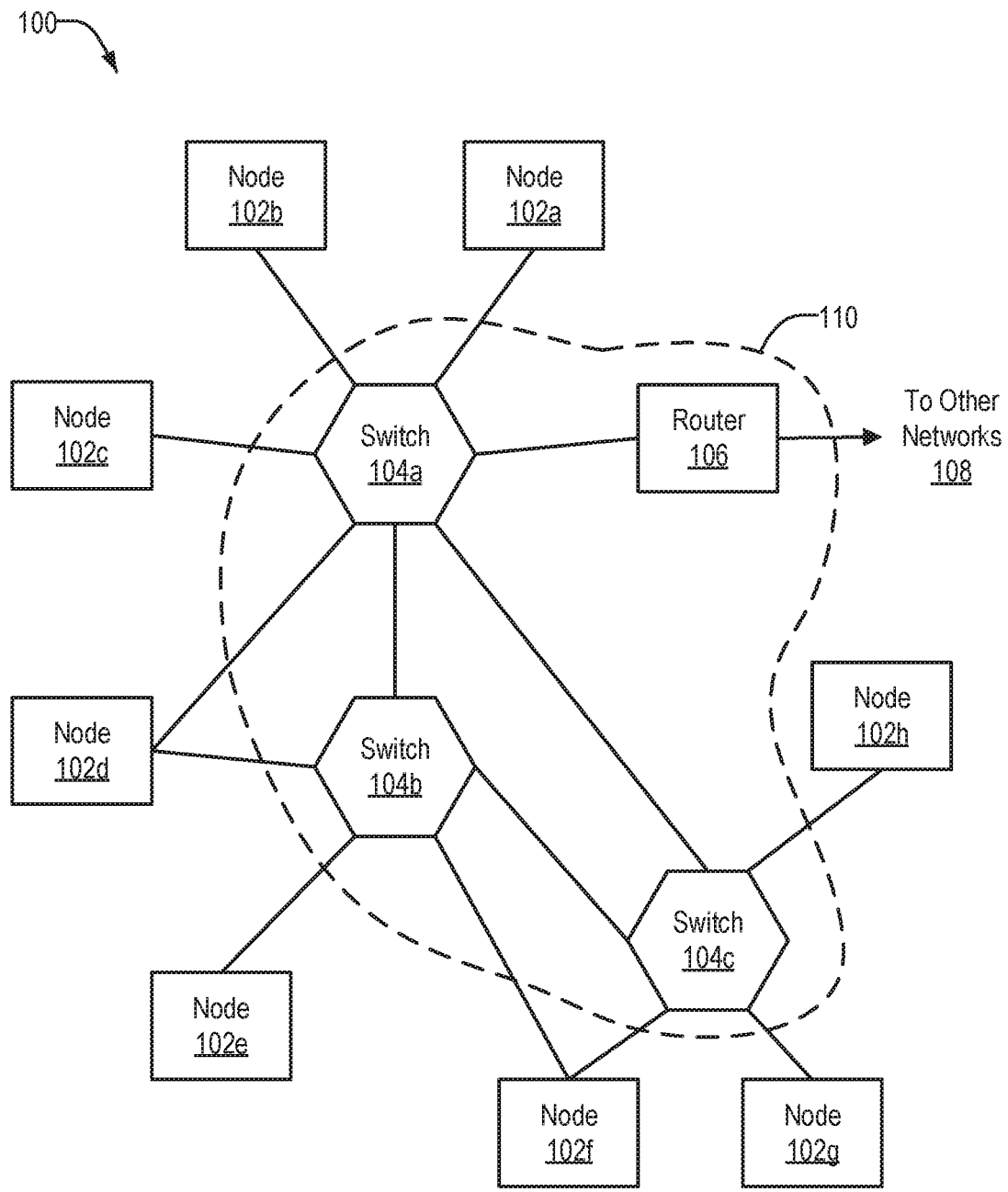
FIG. 1A, FIG. 1B, FIG. 1C, FIG. 1D, and FIG. 1E illustrate an example computing cluster and examples of distributed computation operations that can use techniques of the present disclosure.

A distributed computing system typically includes a cluster of inter-networked computing devices, in which each computing device can communicate and exchange data with each other to support a computation operation. Through parallelism, a distributed computing system can substantially reduce the time needed to complete the computation operation, especially a computation operation that operates on a large volume of data. Specifically, the computation operation can be split into multiple sub-operations, with each sub-operation operating on a subset of the data. Each computing device can receive a subset of the data from the network and perform the sub-operation on the subset of the data in parallel to generate the output.

Various computation operations can be performed by a distributed computing system, such as an artificial neural network computation operation. An artificial neural network (hereinafter, "neural network") is typically implemented in a computing system to have an architecture based on biological neural networks and to process input data in an analogous fashion to biological neural networks. A neural network typically includes a number of cascading neural network layers, with each layer including a set of weights. In an inference operation, a first neural network layer can receive an input data set, combine the input data set with the weights (e.g., by multiplying the input data set with the weights and then summing the products) to generate a first output data set for the first neural network layer, and propagate the first output data set to a second neural network layer, in a forward propagation operation. The second neural network layer performs another set of forward propagation operations on the first output data set to generate a second output data set and propagate the second output data set to higher neural network layers. The forward propagation operations can start at the first neural network layer and end at the highest neural network layer. The forward propagation operations at each neural network layer can represent different stages of extraction and processing of information from the input data set. A decision can then be made based on the output data of the highest neural network layer. For example, each neural network layer can extract and/or process features from an image, and a decision of whether an object is in the image can be generated based on a result of processing the extracted features at the neural network layers.

The set of weights of the neural network can be generated and/or updated by a training operation to improve the likelihood of the neural network generating a correct decision. An example training operation can use a gradient descent scheme. Specifically, as part of the training operation, a sequence of forward propagation operations can be performed on a training input data set, using the set of weights at each neural network layer, to generate a training output data set at the highest level neural network layer. The training output data set can be compared with a reference output data set that supports a particular decision. A set of input data gradients can be generated based on, for example, differences between the training output data set and the reference output data set.

As part of the training operation, each neural network layer can then perform a sequence of backward propagation operations to adjust the set of weights at each neural network layer. Specifically, the highest neural network layer can receive the set of input data gradients and compute, in a backward propagation operation, a set of first data gradients and a set of first weight gradients based on applying the set of weights to the input data gradients in similar mathematical operations as the forward propagation operations. The highest neural network layer can adjust the set of weights of the layer based on the set of first weight gradients, whereas the set of first data gradients can be propagated to the second highest neural network layer to influence the adjustment of the set of weights of the previous neural network layer. The backward propagation operations can start from the highest neural network layer and end at the first neural network layer. The set of weights at each neural network layer can be adjusted to complete one iteration of the training operation. The training operation can be repeated for the same input data set for a number of iterations until a loss objective (e.g., a threshold input data gradient) is achieved.

A training operation is typically a time-consuming process due to the sequential nature and data dependency among the operations involved in the training operation, and due to the large volume of training data involved in the training operation to cover different operation conditions. One way to accelerate the training operation is by using a distributed computing system to distribute the training operation across multiple computing systems, each of which can be configured as a worker node. A set of training input data can be split into multiple portions, with each portion to be processed by a worker node. Each worker node can perform the forward propagation operations independently, and in parallel with each other, based on a portion of the training input data, to generate intermediate outputs for each neural network layer.

After the forward propagation operations complete, each worker node can then perform the backward propagation operations to generate a set of weight gradients for each neural network layer. After the backward propagation operations, each worker node can perform an all-reduce operation, in which each worker node exchanges its set of weight gradients with other worker nodes, and determine a set of average weight gradients based on averaging the locally generated set of weight gradients with the sets of weight gradients received from other worker nodes. As a result of the all-reduce operation, each worker node can have the same set of averaged weight gradients. Each worker node can update the weights for each neural network layer based on the same set of averaged weight gradients. Each worker node can then perform another batch of forward and backward propagation operations using the updated weights on another set of training input data to further update the weights. At the end of the training operation, the worker nodes can also transmit the updated weights to a central repository, where the updated weights received from different worker nodes for each neural network layer can be averaged and stored as part of the neural network model. The weights can then be retrieved by another computing system to perform an inferencing operation.

Although a distributed computing system can substantially reduce the time required to complete a computation operation, the performance improvement brought about by a distributed computing system can diminish due to various internal latencies at the computing device. One major source of internal latency can be attributed to movement of data within the computing system. Specifically, the computing device may include a host processor, one or more hardware data processors (e.g., a neural network hardware accelerator) which can be controlled by the host processor to perform computation operations (e.g., a training operation), and a network adapter. Each of the host processor, the hardware data processor, and the network adapter may include a memory. In a case where the host processor of a computing device is involved in the movement of data between the hardware data processor and the network adapter, the host processor may obtain packets of input data (e.g., weight gradients from other computing devices) from the network adaptor, extract the input data from the packets (e.g., to determine whether there are missing/corrupted packets), and forward the input data to the hardware data processor. Moreover, the host processor may also obtain output data (e.g., locally generated weight gradients) from the hardware data processor, generate packets from the output data, and forward the packets to the network adapter for transmission over the network. Such arrangements, however, can add substantial latency between the flow of data between the hardware data processor and the network adapter, as the data may need to go through multiple protocol/software stacks at the host processor before being transmitted to the hardware data processor (as input data) or to the network adapter (as output data). The software overhead at the host can delay the start of a computation operation at each computing device that depends on the exchange of data (e.g., weight gradients) over the network, which can substantially increase the overall completion time of the distributed computation operation.

Various protocols can be implemented to reduce the host processor's involvement in the transfer of the data between hardware data processors over the network, or over the peer-to-peer interconnect, to reduce the data transfer latency. For example, the network adapter may implement a Remote Direct Memory Access (RDMA) protocol. With RDMA protocol, packets received from the network can be transferred directly to the local memory of hardware data processor, via the interconnect, with minimum intervention from the host processor. To support the RDMA protocol, the network adapter can implement a queue pair comprising a send queue and a receive queue. The send queue can be used to schedule transmission of messages, which may include read operations at the memory of the hardware data processor to obtain data for packet generation and transmission. The receive queue can be used to schedule reception of messages, which can include write operations at the memory of the hardware data processor to store data of packets received from the network.

Specifically, after a computation operation (e.g., a backward propagation operation) completes at an initiator hardware data processor and output data (e.g., reduced weight gradients) are generated, the initiator hardware data processor can store the output data at its local memory. The initiator hardware data processor can then transmit a notification to the host to indicate that the output data have been generated. Upon receiving the notification, the host can post a work queue element (WQE) at the send queue of the network adapter ("initiator network adapter"). The initiator network adapter can process the WQE by transmitting read requests (e.g., read DMA descriptors) to the initiator hardware data processor. The initiator hardware data processor can then execute the read requests by fetching the output data from its local memory and transmitting the fetched output data, via a direct memory access (DMA) operation to the initiator network adapter. The initiator network adapter can then buffer the input data at its local memory, generate packets including the buffered input data, and transmit the packets over the network to a target hardware data processor. On the target hardware data processor side, when the network adapter ("target network adapter") receives the packets, it can post a WQE at its receive queue. When the target network adapter is ready to process the WQE at the receive queue, the target network adapter can transmit write requests (e.g., write DMA descriptors), as well as the packet data, to the target hardware data processor. The target hardware data processor can then execute the write requests by storing the output data at its local memory.

Although the RDMA protocol can reduce the data transfer latency between computing devices, the memory access operations at the computing device prior to the data transfer operation can incur substantial latencies, which can increase the overall completion time of the distributed computation operations. Specifically, after a computation operation completes and output data are generated, the hardware data processor may write the output data back to its local memory, from which the network adapter can fetch the output data. In a case where the data is written back and fetched from an off-chip memory such as dynamic random access memory (DRAM) and high-bandwidth memory (HBM), due to the limited bandwidth of the off-chip memory the memory access operations can incur substantial latencies.

Additional latency can be introduced to the data transfer operation as a result of the write-back operations. For example, the hardware data processor can only store a limited number of outstanding read requests from the network adapter. As a result, the hardware data processor can only execute the read DMA descriptors and transfer the data to the network adapter in batches. The wait time between batches can further delay the transfer of data from the hardware data processor to the network adapter, as well as the sending of packets over the network. As another example, in a case where the host triggers the network adapter to fetch the data from the hardware data processor after receiving a notification from the hardware data processor that the data is ready, the communication between the host and each of the network adapter and the hardware data processor, as well as the software overhead at the host, can also delay the data transfer operations.

On the other hand, the writing back of certain types of output data to the off-chip memory may be unnecessary or non-essential. For example, for an all-reduce operation to determine the average weight gradients, the worker nodes can be arranged and operated in a ring topology. In the ring topology, a node can receive a set of input weight gradients from a previous node in the ring, perform a local all-reduce operation by combining the input weight gradients with its locally generated weight gradients to generate a set of partial averaged weight gradients, and propagate the output weight gradients to a next node in the ring. The next node then repeats the local all-reduce operation to update the set of partial averaged weight gradients. A set of final output weight gradients generated by the last node in the ring can represent an average of the output weight gradients generated by all the nodes in the ring, and can be used by each node in the ring to update the weights at the nodes. But the partial averaged weight gradients generated by each node (except the last node) only represent the temporary results of the all-reduce operation and cannot be used to update the weights. Given that a node has no use for the partial averaged weight gradients after sending the partial averaged weight gradients to the next node in the ring, it is not necessary for the node to write back the partial averaged weight gradients to its local memory, or at least the write-back is not essential for a distributed training operation. As a result, the overall performance of the distributed computing system can become degraded due to latencies incurred for the unnecessary (or non-essential) write-back operations.

Examples of the present disclosure relate to memory access operations, and more specifically, to performing memory access operations to reduce data transfer latency between a hardware data processor (e.g., a neural network hardware accelerator) and a network adapter. The hardware data processor includes a computation engine, a controller including a DMA engine, an on-chip local memory, and an off-chip local memory, and can be coupled with the network adapter via an interconnect (e.g., a Peripheral Component Interconnect Express (PCIE) root-complex). The computation engine can perform a computation operation (e.g., a backward propagation operation) to generate local input data (e.g., local weight gradients), and store the local weight gradients at the on-chip local memory. The off-chip local memory can also store remote input data (e.g., remote weight gradients) received from other hardware data processors. The DMA engine can fetch the local input data and the remote input data from, respectively, the on-chip and off-chip local memories and perform a combine operation of the local input data and the remote input data to generate output data (e.g., an all-reduce operation to generate partial averaged weight gradients). The DMA engine can also perform a DMA operation and transfer the output data to a local memory of the network adapter. The network adapter can then fetch the output data from its local memory, generate packets including the output data, and transmit the packets to other worker nodes over the network.

Specifically, the controller of the hardware data processor can have access to the base address of the local memory of the network adapter. The base address can be accessible from, for example, a Base Address Register (BAR) of the PCIE root-complex. The DMA engine can fetch the local input data and the remote input data and perform the combine operation to generate the output data. The DMA engine can also generate memory write requests that point to the base address of the network adapter's local memory and transmit the output data and the memory write requests to the network adapter. The output data may be buffered at an internal buffer of the interconnect. Upon receiving the data move descriptors, the network adapter can fetch the output data from the internal buffer of the interconnect and store the output data at its local memory.

In some examples, the hardware data processor may be directly connected to a second hardware data processor via a peer-to-peer interconnect (e.g., a peer-to-peer PCIE link). The DMA engine at the controller can also perform a DMA operation and transfer the output data to a target local memory of the second hardware data processor via the peer-to-peer interconnect. In such examples, the DMA engine can perform a write operation by transmitting write requests (which include the base address of the target local memory), as well as the output data, over the peer-to-peer interconnect to the second hardware data processor, which can then execute the write requests to store the output data at the target local memory.

In the examples above, the DMA engine of the hardware data processor and the network adapter can also use the RDMA protocol to receive remote data. For example, the network adapter may implement a queue pair comprising a send queue and a receive queue. When the network adapter receives a set of packets containing the remote data (e.g., remote weight gradients), a WQE can be posted in the receive queue. The network adapter can then process the WQE by sending write requests (e.g., write DMA descriptors) and the remote data to the hardware data processor via the root-complex interconnect. The DMA engine at the hardware data processor can then execute the write DMA descriptors by fetching the remote data from the internal buffer of the root-complex interconnect. As another example, the DMA engine of the hardware data processor and the network adapter can also use the RDMA protocol to send other types of output data generated by the computation engine, such as the set of final weight gradients generated by the final node in the ring. In such an example, the set of final weight gradients can be written back to the off-chip local memory of the hardware data processor of the final node. The controller can post a WQE at the send queue of the network adapter, which prompts the network adapter to fetch the set of final weight gradients by sending read DMA descriptors to the hardware data processor. The DMA engine can then execute the read DMA descriptors by sending the set of final weight gradients to the network adapter's local memory via the root-complex interconnect. The network adapter can then send the set of final weight gradients to other nodes in the ring. Meanwhile, the hardware data processor of the final node can also fetch the set of final weight gradients from its off-chip local memory and use the set of final weight gradients to update the weights.

With the disclosed techniques, the hardware data processor can send certain output data, such as the partial averaged weight gradients, to the local memory of the network adapter instead of writing back the data to its local memory. Such arrangements can reduce the latency incurred by the write-back operation, especially in a case where the write-back operation is performed on an off-chip local memory. Moreover, as the hardware data processor initiates the transfer of the output data to the network adapter, rather than the network adapter being triggered by the host to initiate the transfer, the delay incurred to the data transfer operations due to the communication between the host and each of the network adapter and the hardware data processor, as well as the software overhead at the host, can be reduced. All these can speed up the data transfer operations and improve the performance of the distributed system in handling a distributed computation operation, such as a training operation of a neural network.

In the following description, various examples will be described. For purposes of explanation, specific configurations and details are set forth to provide a thorough understanding of the examples. However, it will also be apparent to one skilled in the art that the examples may be practiced without the specific details. Furthermore, well-known features may be omitted or simplified in order not to obscure the embodiments being described.

FIG. 1A illustrates an example of a computing cluster 100. Computing cluster 100 can include a group of computing resources connected with switches, and can be configured to run in parallel. In many implementations, the various computing resources form a single logical computing resource. The example computing cluster 100 illustrated in FIG. 1A includes multiple nodes 102a-h and switches 104a-c. In some implementations, computing cluster 100 may also include a router 106.

The nodes 102a-h illustrated in FIG. 1A may represent various computing resources. For example, one or more nodes 102a-h may be a computer, such as a server computer. Computers used in cluster applications may include one or more processors, and these processors may include one or more processing cores. These computers may also include memory and peripheral devices. In some implementations, these computers may use an adapter device to connect to a switch 104a-c in computing cluster 100. Other examples of computing resources include storage devices (e.g., hard drives), storage subsystems (e.g., an array of storage devices), Input/Output (I/O) modules, and hardware data processors, such as hardware neural network accelerators.

The switches 104a-c may provide connectivity between the various nodes 102a-h. Each node 102a-h may be connected to computing cluster 100 through a connection with a switch 104a-c. In some cases, a node 102a-h may be connected to more than one switch 104a-c. Switches may also be connected to other switches. In most cases, any port on a switch 104a-c may be used to connect to either a node 102a-h or another switch. In most implementations, size of computing cluster 100 can quickly and easily be expanded by connecting more switches and nodes.

The network of switches 104a-c may provide multiple paths from any node 102a-h to any another node 102a-h. A switch 104a-c may have multiple connections with another switch 104a-c, which provides additional paths between the switches 104a-c. In some cases, the nodes 102a-h may be connected to more than one switch 104a-c, also creating more paths. Packets from one node 102a-h may use multiple paths at the same time to reach another node 102a-h. Alternatively or additionally, packets from one node 102a-h to another node 102a-h may follow only one path. In some cases, at each switch 104a-c, a decision may be made as to which path a packet will follow. In other cases, a packet's path may be determined in advance, typically at the source node. A stream of packets from one node 102a-h to another node 102a-h may be referred to as a packet flow, or simply as a "flow." In some cases, the packets in a flow are related, such as, for example, when the packets together form one message.

In some implementations, computing cluster 100 may be connected to a router 106. The router 106 may provide a connection to other networks 108, such as other clusters or sub-networks (subnets), Local Area Networks (LANs), Wide Area Networks (WANs), or the Internet.

The interconnected switches 104a-c (and the router 106, if present) may be referred to as a switch fabric, fabric, or more simply "network." Herein, the terms "fabric" and "network" may be used interchangeably.

Computing cluster 100 may provide more computing power and better reliability. The individual computing resources may work cooperatively to solve a large problem that one computer may not be able to solve alone, or may take a very long time to solve alone. In some cases, a computing cluster may provide performance similar to a super computer but for less cost and with less complexity. The switched fabric architecture used by a computing cluster may also have the advantage of being fault tolerant and scalable. In a switched fabric architecture, typically every link has one device attached at each end of a link. Hence, each link is only depending on the behavior of, at most, two devices. A switched fabric may also be easily scaled by adding more switches, which provides more ports to attach more nodes. In some cases, adding more switches may increase the aggregate bandwidth of the cluster. Multiple paths between the nodes may also keep aggregate bandwidth high and provide redundant connections in case of link failures.

Computing cluster 100 may be used for various applications, such as high-performance computing. High-performance computing involves using parallel processing to run compute-intensive applications. Scientific researches, engineers, and academic institutions may use high-performance computing for complex modeling or simulations, such as, for example, car crash simulations, weather modeling, or atomic simulations. In addition, computing cluster 100 may be used for financial applications, distributed storage, and databases. Financial applications, such as high-frequency trading, may also examine large amounts of data and are generally relied upon to react quickly (i.e., much faster than a human being) to changes in the data. Distributed storage allows very large amounts of data to be accessed from multiple locations. Storage area networks are one form of distributed storage. Databases also store a large amount of data and must provide fast ways to locate specific information stored within the database.

Figure 1B:
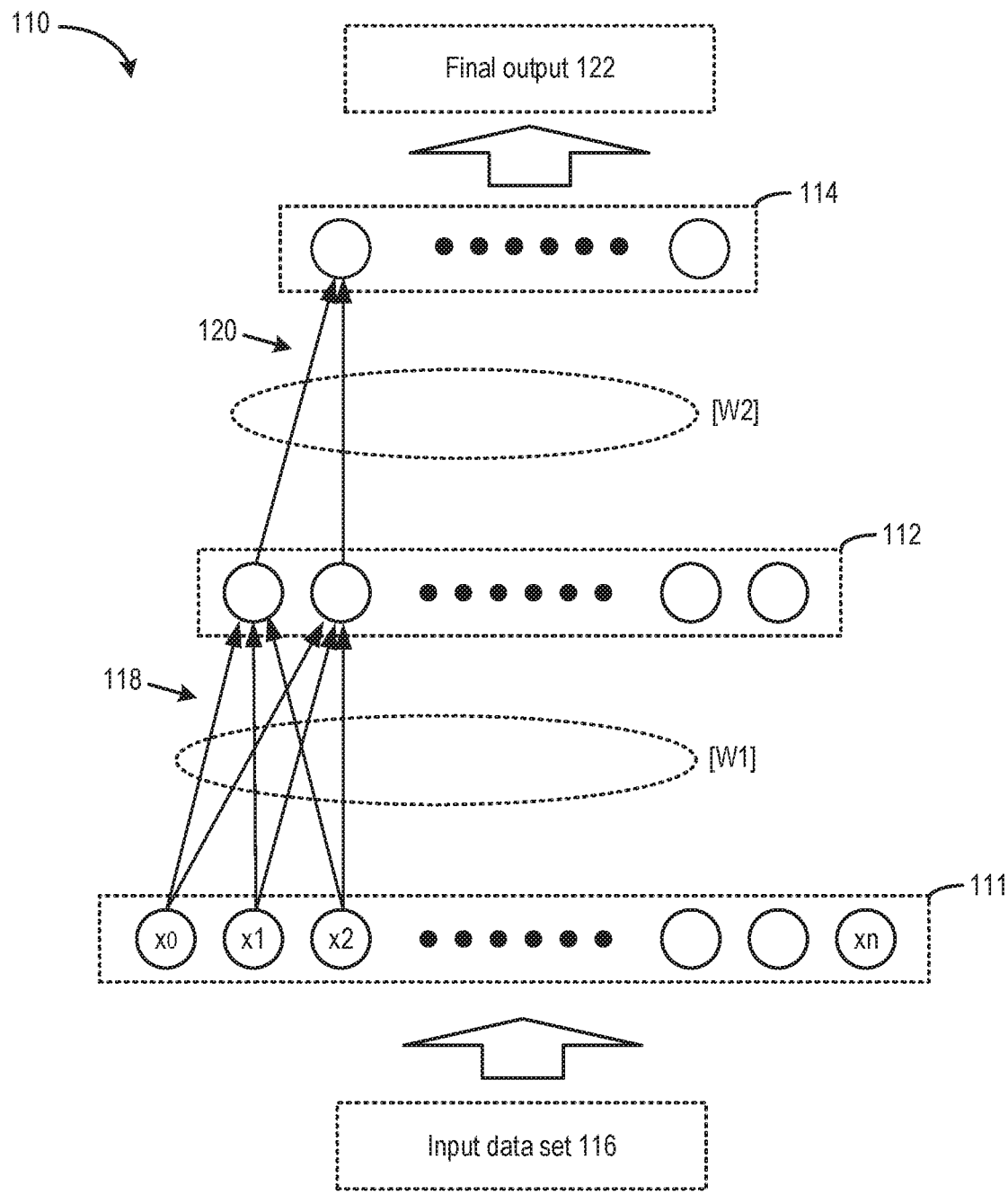

In some examples, computing cluster 100 can be used to support neural network computation operations. A neural network is typically implemented in a computing system to have an architecture based on biological neural networks and to process input data in an analogous fashion to biological neural networks. FIG. 1B illustrates an example of an artificial neural network 110. As shown in FIG. 1B, a neural network typically includes a number of cascading neural network layers, including first neural network layer 111, second neural network layer 112, third neural network layer 114, etc. Each layer may be associated with a set of weights, such as weights labelled "[W1]" and "[W2]". In an inference operation, first neural network layer 111 can receive an input data set 116, which can include, for example, image data, audio data, medical data, or other type of data to be analyzed. First neural network layer 111 can combine input data set 116 with the weights [W1] (e.g., by multiplying the input data set with the weights and then summing the products) to generate a first output data set 118 for first neural network layer 111 and propagate first output data set 118 to second neural network layer 112, in a forward propagation operation. Second neural network 112 layer performs another set of forward propagation operations on first output data set 118 from first neural network layer 111 to generate a second output data set 120 and propagate second output data 120 set to third neural network layer 114. In FIG. 1B, third neural network layer 114 can be the highest output neural network layer and can generate a final output 122, including a decision/prediction made about input data set 116. Final output 122 may indicate, for example, whether an image contains a target object, information contained in audio data, or a clinical prediction of a patient.

Figure 1C:
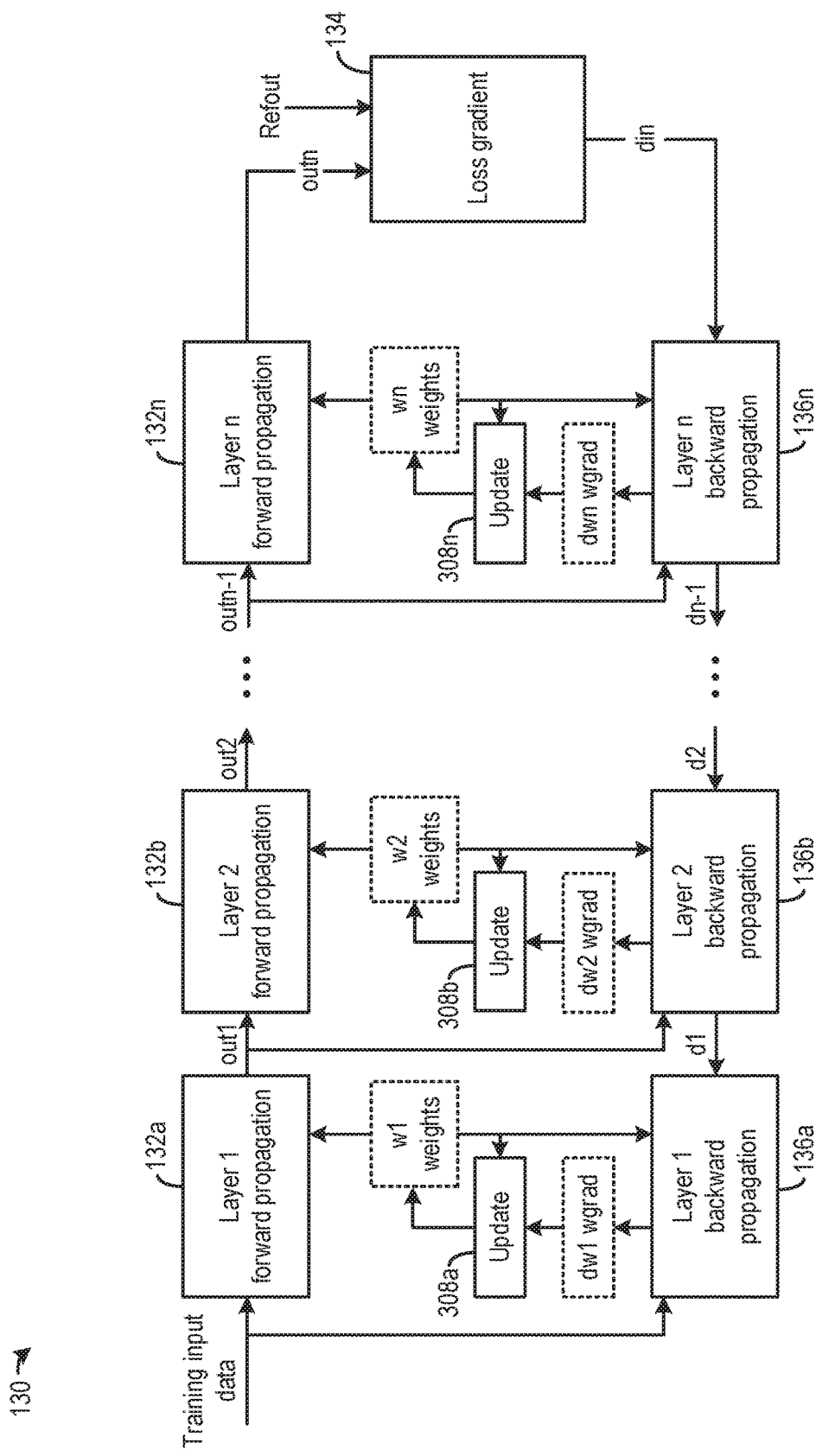

The set of weights of neural network 110 can be generated and/or updated by a training operation to improve the likelihood of the neural network generating a correct decision. FIG. 1C illustrates an example of a training operation 130, based on a gradient descent scheme. Specifically, as part of the training operation, a sequence of forward propagation operations, including operations 132a, 132b, and 132n, can be performed on a training input data set, using the set of weights at each neural network layer, to generate a training output data set (labelled "outn" in FIG. 1C) at the highest level neural network layer. The training output data set can be compared with a reference output data set (labeled "refout" in FIG. 1C) that supports a particular decision. A set of input data gradients (labeled "din" in FIG. 1C) can be generated by applying a loss gradient function 134 on, for example, differences between the training output data set and the reference output data set.

As part of the training operation, each neural network layer can then perform a sequence of backward propagation operations 136 to adjust the set of weights at each neural network layer. Specifically, the highest neural network layer (e.g., third neural network layer 114) can receive the set of input data gradients and compute, in a backward propagation operation 136n, a set of first data gradients (labeled "dn−1") and a set of first weight gradients (labelled "dwn wgrad"), based on applying the set of weights to the input data gradients in similar mathematical operations as the forward propagation operations. The highest neural network layer can perform a weight update operation 308n to adjust the set of weights of the layer based on the set of first weight gradients, whereas the set of first data gradients dn−1 can be propagated to the second highest neural network layer to influence the adjustment of the set of weights of the previous neural network layer. The backward propagation operations can start from the highest neural network layer and end at the first neural network layer. The set of weights at each neural network layer can be adjusted at a respective update operation (e.g., update operations 308b, 308a) to complete one iteration of the training operation. The training operation can be repeated for the same input data set for a number of iterations until a loss objective (e.g., a threshold input data gradient) is achieved.

Figure 1D:
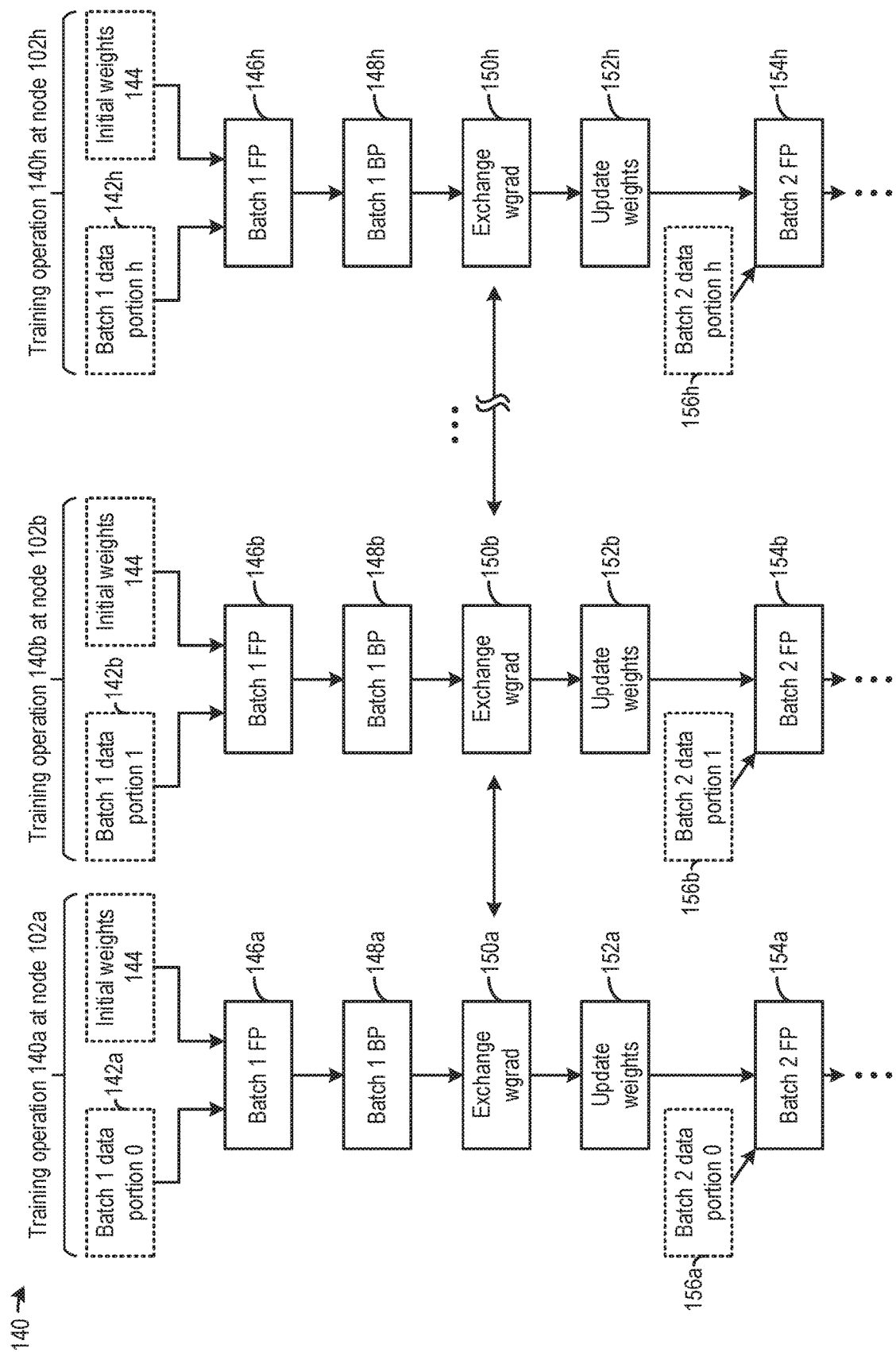

A training operation is typically a time-consuming process due to the sequential nature and data dependency among the operations involved in the training operation, and due to the large volume of training data involved in the training operation to cover different operation conditions. One way to accelerate the training operation is distribute the training operation across a distributed computing system, such as computing cluster 100. FIG. 1D illustrates an example of a distributed training operation 140, which includes training operations 140a, 140b, and 140h, with each training operation performed at a node of computing cluster 100 such as nodes 102a-h, with each node configured as a worker node to perform a training operation. A first batch of training input data can be split into multiple portions 142a, 142b, 142h, etc., with each portion to be processed by, respectively, worker node/node 102a, 102b, and 102h. Each worker node can also receive the same initial set of weights 144 and perform the forward propagation operations 146 (e.g., forward propagation operations 146a, 146b, and 146h) independently, and in parallel with other, based on the received portion of the training input data and weights 144, to generate intermediate outputs for each neural network layer.

After the forward propagation operations 146 complete, each worker node can perform the backward propagation operations 148 (e.g., backward propagation operations 148a, 148b, and 148h) independently to generate a set of weight gradients for each neural network layer. After backward propagation operations 148, each worker node can perform an exchange operation 150 (e.g., exchange operations 150a, 150b, and 150h), in which each worker node exchanges its set of weight gradients with other worker nodes over the network, and then determines averaged weight gradients for each neural network layer. The purpose of exchange operations 150 is to ensure that each worker node has the same set of weight gradients at the end of backward propagation operations 148 and can apply the same set of weight gradients to initial weights 144 to obtain the updated weights in weights update operations 152 (e.g., weights update operations 152a, 152b, and 152h). Each worker node can then perform another batch of forward and backward propagation operations, such as forward propagation operations 154a, 154b, and 154h, using the updated weights on portions 156a 156b, and 156h of a second batch of training input data to further update the weights. At the end of the training operation, the worker nodes can also transmit the updated weights to a central repository, where the updated weights received from different worker nodes for each neural network layer can be averaged and stored as part of the neural network model. The weights can then be retrieved by another computing system to perform an inferencing operation.

Compared with an arrangement where a single worker node is used to perform a training operation based on a large volume of training data, the distributed training operation 140 allows parallel training operation to be performed at multiple worker nodes, with each worker node operating on a portion of the training data. Such arrangements can substantially reduce the total time required to complete the training operation. But to achieve the most benefit from distributing the training operation over computing cluster 100, the protocol used for communication between nodes 102 of computing cluster 100 should provide high bandwidth and low latency. High bandwidth means that a large volume of traffic should be able to traverse the cluster, and low latency means that the traffic should be able to travel from source to destination as quickly as possible. Here, the source and destination refer not only the nodes, but also a process/operation on the nodes that release and consume the data, such as training operation 140a on node 102a and training operation 140b on node 102b. The total latency incurred in releasing the data from the source operation of a node into the network, transferring the data over the network, and delivering the data to the destination operation of another node, can slow down the execution of both the source and destination operations. For example, referring to FIG. 1D, worker node 102a completes the first batch of training operation 140a only after exchange operation 150a of weight gradients completes, and weights update operation 152a completes before starting the second batch of training operation 140a.

Figure 1E:
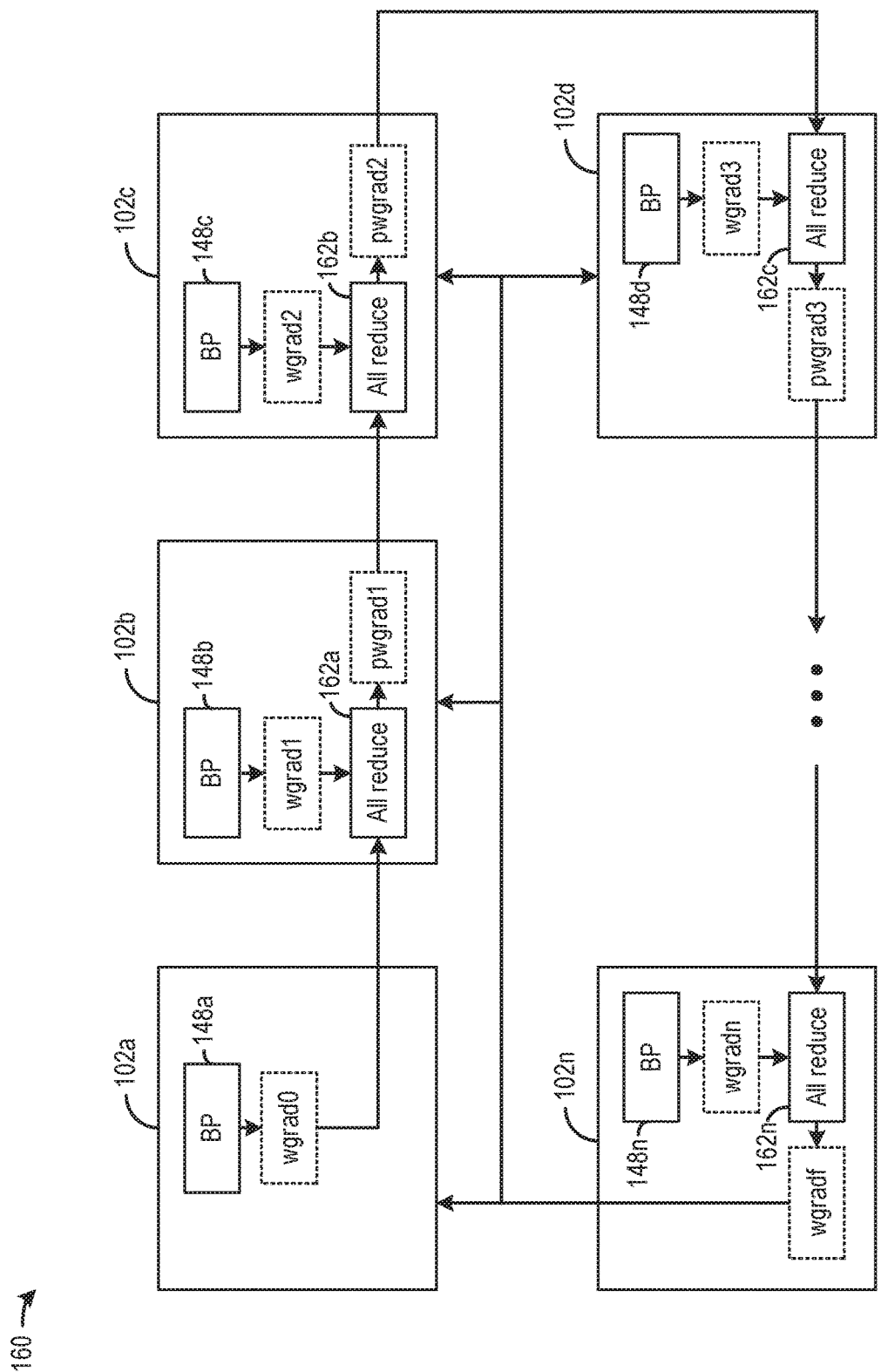

In some examples, the nodes of computing cluster 100 can be arranged/operated in a ring topology to perform weight gradients exchange operations, such as weight gradients exchange operations 150a-150h of FIG. 1D. FIG. 1E illustrates an example ring topology 160, comprising nodes 102a, 102b, 102c, 102d, . . . , and 102n of computing cluster 100. As shown in FIG. 1E, each node in the ring topology 160 can perform a backward propagation operation 148 of FIG. 1D to generate a local weight gradient. For example, node 102a can perform backward propagation operation 148a to generate a set of local weight gradients wgrad0, node 102b can perform backward propagation operation 148b to generate a set of local weight gradients wgrad1, node 102c can perform backward propagation operation 148c to generate a set of local weight gradients wgrad2, whereas node 102n can perform backward propagation operation 148n to generate a set of local weight gradients wgradn. Each backward propagation operation can be performed in parallel based on the input data gradients from a forward propagation operation (not shown in FIG. 1E), which is in turn performed on a portion of training data as shown in FIG. 1D.

After a local weight gradient is generated at a node, the set of local weight gradients can be combined in an all-reduce operation to generate a set of final weight gradients. In one example, the all-reduce operation can include averaging the sets of local weight gradients from each node to generate a set of final weigh gradients. The all-reduce operation can be performed sequentially across ring topology 160 as part of exchange operation 150. For example, after node 102a generates local weight gradients wgrad0, node 102a can transmit wgrad0 to the next node in ring topology 160, which is node 102b. Node 102b also generates local weight gradients wgrad1. Node 102b can perform an all-reduce operation 162a on local weight gradients wgrad0 and wgrad1 to generate partial averaged weight gradients pwgrad1. Node 102b can then propagate partial averaged weight gradients pwgrad1 to node 102c. Node 102c also generates local weight gradients wgrad2. Node 102c can perform an all-reduce operation 162b on local weight gradients wgrad2 and partial averaged weight gradients pwgrad1 to generate partial averaged weight gradients pwgrad2. Partial averaged weight gradients pwgrad2 are then propagated to node 102d, which updates weight gradients pwgrad3 by an all-reduce operation 162c. The partial averaged weight gradients are then propagated and updated through additional nodes along ring topology 160 until reaching the final node of the ring topology, node 102n. At node 102n, an all-reduce operation 162n can be performed to combine the set of local weight gradients wgradn with the partial averaged weight gradients received from a preceding node to generate the set of final weight gradients wgradf. Node 102n can then transmit the set of final weight gradients wgradf to other nodes (102a, 102b, 102c, 102d, etc.) of ring topology 160.

In FIG. 1D and FIG. 1E, if each exchange operation takes a long time due to the latency incurred in transferring weight gradients, the total time required for each batch of training operation 140a will increase, which can diminish the performance improvements in distributing the training operation over computing cluster 100. Several operations may be major contributors to latency, including overhead caused by executing network protocol code within the operating system, context switches required to move in and out of kernel mode and to send out data, etc. For example, a typical network protocol stack may cause a round-trip latency of approximately 100 microseconds, assuming a non-congested, near-zero-delay network. This delay, however, may more typically be compounded with millisecond long spikes due to scheduling delays, tens of millisecond long spikes when an application is not designed to avoid network stack issues, and/or seconds-long delays when packets are dropped on a congested link. Computing clusters may be designed with high-bandwidth hardware, and high-bandwidth hardware is typically more sensitive to processor and memory copying overhead.

Virtual Interface (VI) Architecture (VIA) server messaging protocols were developed to provide high-bandwidth, low-latency links between nodes in a computing cluster. Examples of protocols similar to VIA include InfiniBand, Internet Wide Area RDMA Protocol (iWARP), and RDMA over Converged Ethernet (RoCE). Each of these protocols include a kernel bypass framework, often referred to as RDMA. iWARP provides a kernel bypass framework over the transmission control protocol/Internet protocol (TCP/IP) protocol. RoCE provides a kernel bypass framework over Ethernet-type networks. InfiniBand provides a kernel bypass framework over an InfiniBand-specific network. Sometimes the terms "InfiniBand" and "RDMA" are used interchangeably, though other protocols (such as iWARP and RoCE) also provide an RDMA-style, kernel bypass framework. RDMA-based devices may also allow multiple applications to directly access the hardware without interfering with each other. RDMA devices may rely on a kernel only for control operations, to perform initialization, and for some coordination that may be required for interrupt handling; but otherwise, an RDMA device may operate independently of the kernel. This means that a processor need not be involved in RDMA operations. RDMA frameworks may also provide optimizations such as polling-mode completion handling, which may be beneficial for providing ultra-low latency.

RDMA can include an extension of Direct Memory Access (DMA). DMA typically allows certain hardware subsystems to access main system memory without using a processor. Similarly, RDMA allows one computer to access memory on another computer over a network, without involving a processor in either computer. Hence, a local computer may be able to perform reads, writes, or atomic operations on a remote computer's memory without intermediate copies being made by a processor at either the local or the remote computer. In many implementations, RDMA is made possible by the local computer and the remote computer each having an RDMA adapter.

Figure 2A:
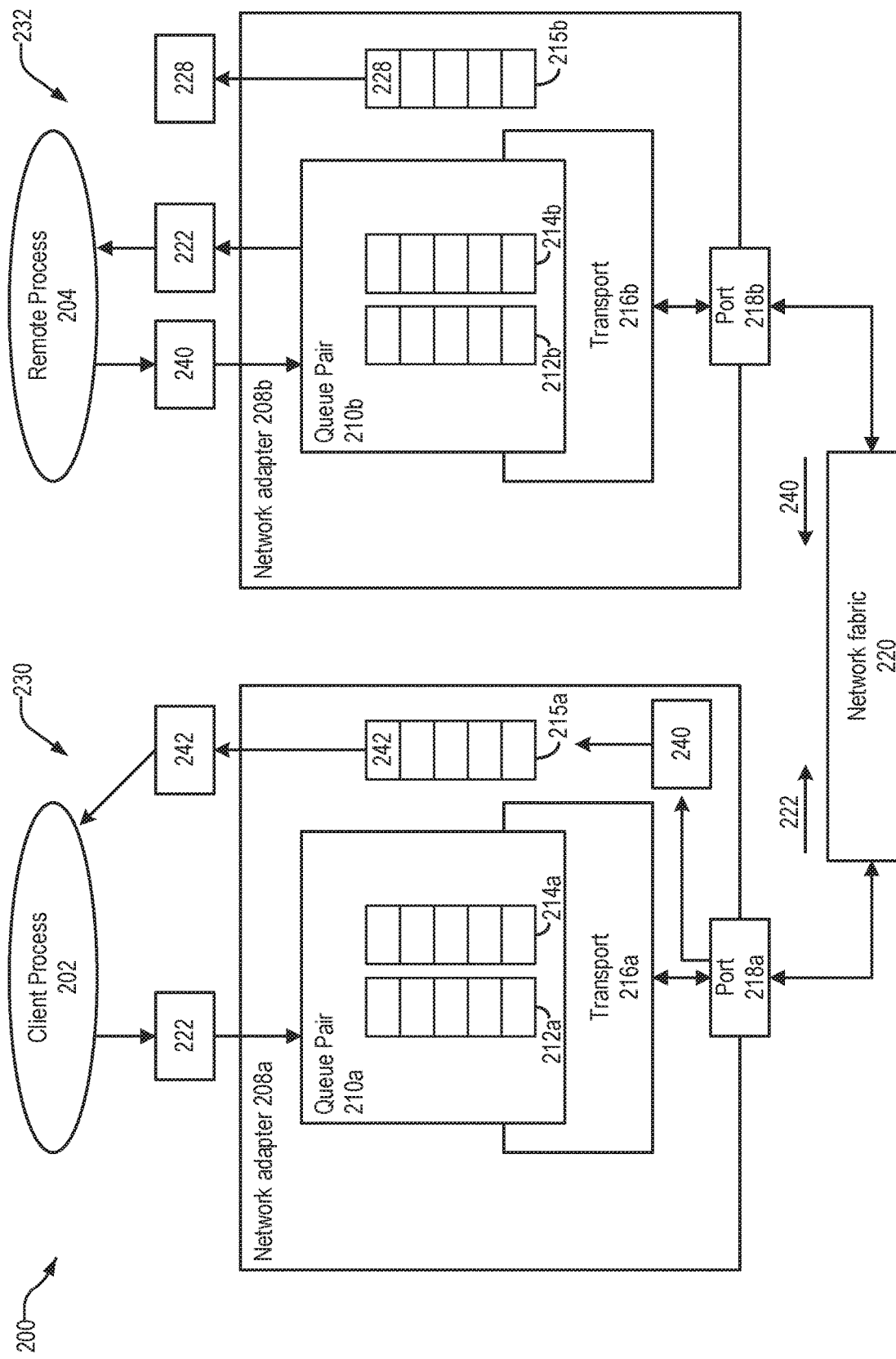
FIG. 2A and FIG. 2B illustrate an example of a communication stack that can use techniques of the present disclosure.

FIG. 2A illustrates an example of a communication stack 200 that may be used to implement a kernel bypass framework in cluster 100. Using communication stack 200, such as is illustrated in FIG. 2A, a client process 202 may be able to communicate directly with a remote process 204 on a remote system 232, without help from a processor at either the local system 230 or the remote system 232. The example of FIG. 2 illustrates, as an example, a communication stack 200 between two processes executing on two different systems. As will be explained below, a similar communication stack can be configured between any two processes communicating across a network fabric 220, which can be an InfiniBand-specific network. Also, while one system 230 is called "local" and the other system 232 is called "remote," it is understood that in some implementations the communication stack 200 can also operate in the reverse direction, such that the remote system 232 can originate messages directed at the local system 230.

In some implementations, the communication stack 200 illustrated in FIG. 2A operates with minimal use of a processor at either the local 230 or the remote 232 system. Removing or reducing network traffic control duties from processors may be accomplished through "work queues," also called "work queue pairs" or simply "queue pairs" 210a-b. Queue pairs 210a-b can be implemented at the local memory of each network adapter (not shown in FIG. 2). For each communication channel between the local system 230 and the remote system 232, a queue pair 210a-b may be assigned at both systems 230 and 232. A queue pair 210a-b includes a send queue 212a-b to manage processing of traffic headed for the network fabric 220, and a receive queue 214a-b to manage processing of traffic coming in from the network fabric 220. In some implementations, the client process 202 initiates a queue pair 210a-b when establishing a communication channel with the remote process 204. In these implementations, the client process 202 can initiate additional work queues for communicating with the same remote process 204, with different processes running on the same remote system 232, or with processes running on other remote systems. Client processes and remote processes include non-kernel or operating system processes, such as user applications and/or driver programs.

In some implementations, the queue pair 210a at the local system 230 resides on a network adapter 208a. Network adapter 208a may be configured to communicate with the network fabric 220. Network adapter 208a may include additional queue pairs that are assigned to other processes, to the same client process 202, or that may currently be unused. Queue pair 210a may be implemented in hardware, in software (for example in a driver), or in a combination of hardware and software. In addition to queue pair 210a, network adapter 208a further includes a completion queue 215a, which can be implemented in the local memory of network adapter 208a, to track the status of processing of the traffic managed by queue pair 210a. In addition, network adapter 208a may also include a transport layer 216a, which manages communication with the network fabric 220 and remote process 204. Network adapter 208a may also include a physical port 218a, connecting network adapter 208a to fabric 220.

The client process 202 may initiate a transaction to the remote process 204 by placing a "work queue element" (often abbreviated as WQE) into the local send queue 212a. In the example of FIG. 2A, the WQE can represent/include a message 222 to be sent from client process 202 to remote process 204. The work queue element may represent a transaction, such as a read, a write, or an atomic transaction of data. In some implementations, the work queue element may also include information identifying the remote process 204 as the target of the transaction. Remote process 204 can then send a notification (e.g., a doorbell interrupt signal) to network adapter 208a. Upon receiving the doorbell interrupt signal, network adapter 208a may process the WQE directly from send queue 212a. Network adapter 208a may generate one or more packets representing message 222 using the information in the work queue element. The transport layer 216a may transmit these one or more packets through the port 218a to the network fabric 220.

The remote system 232 may receive the packet or packets from the network fabric 220 at a network adapter 208b. Like network adapter 208a, network adapter 208b includes a port 218b connecting network adapter 208b to the network fabric 220. Network adapter 208b may also include a transport layer 216b, which manages communication with the network fabric 220 and the client process 202. Network adapter 208b may also include a queue pair 210b that is assigned to the remote process 204.

The packet or packets received at the remote system 232 from the network fabric 220 may be directed by the transport layer 216b to a receive queue 214b. In some implementations, network adapter 208b may reassemble message 222 generated by the client process 202 and place a WQE into receive queue 214b representing/including message 222. Network adapter 208b may pop the WQE from receive queue 214b and send message 222 to remote process 204. In addition, a "completion queue entry" (CQE) 228 can be stored in a completion queue 215b, which can be implemented in the local memory of network adapter 208b to provide an indication that message 222 has been transferred to remote process 204, and that remote process 204 can start operating on message 222. After operating on message 222, remote process 204 can generate a response 240 that is to be returned to the client process 202. The remote process 204 may place a work queue element, containing/representing the response, in its own send queue 212b. The response may then traverse the fabric 220 back to the local system 230, where it is stored in completion queue 215a as a CQE 242. CQE 242 can also be sent to client process 202 to indicate that the transmission of message 222 completes.

As part of the processing of WQEs at send queue 212 and at receive queue 214, network adapter 208 may perform a direct memory access (DMA) operation to fetch or write data into a memory. For example, to process a WQE at send queue 212, network adapter 208 may fetch data from the memory via a DMA operation to generate packets for transmission to network fabric 220. Moreover, to process a WQE at receive queue 214, network adapter 208 may extract data from the received packets and write the received data via a DMA operation into the memory.

Figure 2B:
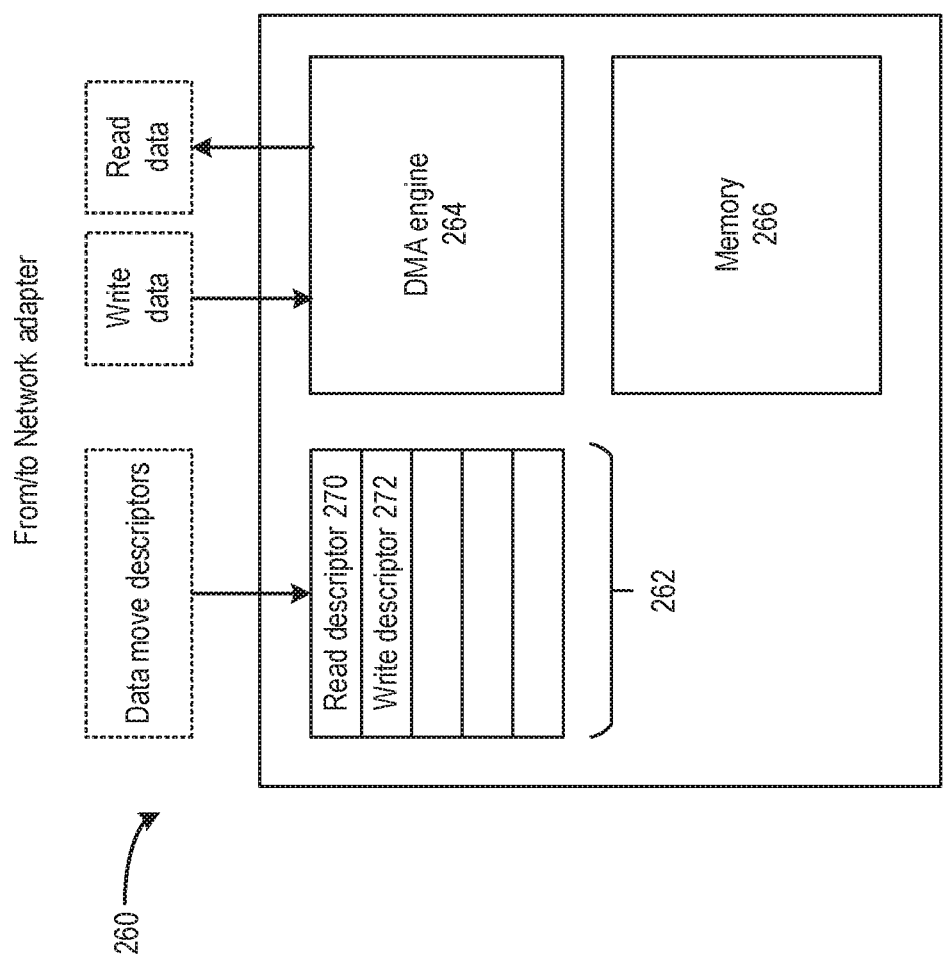

FIG. 2B illustrates an example of a memory system 260 that supports a DMA operation. As shown in FIG. 2B, memory system 260 includes an access queue 262, a DMA engine 264, and a memory 266. Access queue 262 can store DMA descriptors, such as a read descriptor 270 and a write descriptor 272, each specifying a memory access operation (read/write), as well as the source and the destination of the memory access operation. In some examples, access queue 262 may include a read access queue to store read descriptors and a write access queue to store write descriptors. Memory system 260 can support the RDMA operations over a network as shown in FIG. 2A, as well as DMA operations over interconnects (e.g., a PCIE root-complex, a peer-to-peer PCIE link).

To fetch data from memory system 260, a network adapter (e.g., network adapter 208a, network adapter 208b) can transmit data move descriptors, such as a read descriptor 270, to memory system 260. Read descriptor 270 can include various information including, for example, a source address of memory 266 that stores the data to be fetched, as well as a destination address of a local memory of the network adapter to receive the fetched data. Read descriptor 270 can be stored in access queue 262. Upon detecting that read descriptor 270 is stored in access queue 262, DMA engine 264 can fetch read descriptor 270 from access queue 262 and perform a read operation at memory 266 to fetch the requested data (labelled "read data" in FIG. 2B). DMA engine 264 can then transmit the requested data, as well as memory write requests including the destination of the requested data, to the network adapter. Upon receiving the requested data and the memory write requests, the memory controller of the network adapter can write the requested data at the local memory of the network adapter based on the memory write requests. Later, the network adapter can fetch the requested data from its local memory to generate packets. On the other hand, to write data into memory 266, the network adapter can transmit data move descriptors, such as a write descriptor 272 as well as the data to be written into the memory (labelled "write data" in FIG. 2B), to memory system 260. The write descriptor can be stored at access queue 262. DMA engine 264 can fetch write descriptor 272 from access queue 262 and execute the write descriptor by writing the received data into memory 266.

In the example communication stack 200 of FIG. 2A, the involvement of operating system kernel at both local system 230 and remote system 232 in transferring of messages 222 and response 240 are at a minimum. For example, client process 202 can send message 222 to network adapter 208a directly without involvement of the operating system kernel of local system 230. Likewise, remote 204 can receive message 222 directly from network adapter 208b without involvement of the operating system kernel of local system 232. Moreover, the fetching and storing data at the memory are performed via DMA operations without involvement of the operating system kernel of local system 230. As a result, the latency incurred delivering message 222 between client process 202 and remote process 204 can be reduced.

The kernel bypass framework, provided by communication stack 200, can also be implemented in a computing system having dedicated computing resources to support certain data processing applications, such as a neural network hardware accelerator to support neural network computations. In such a computing system, the dedicated computing resource can directly receive packets from the network adapter with minimum (or no) involvement from the operating system kernel, which can speed up the data processing application supported by the computing resource.

Figure 3A:
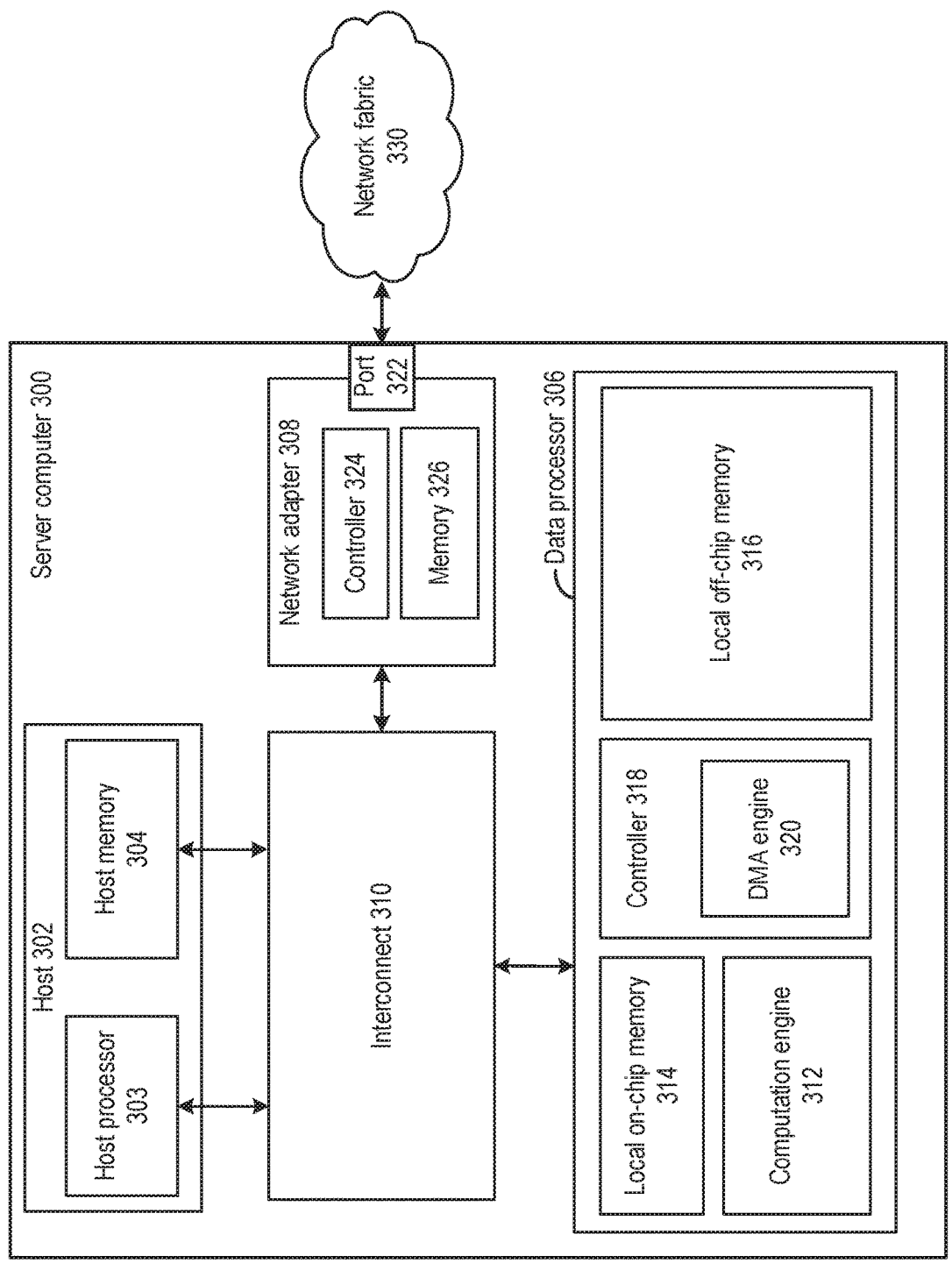
FIG. 3A and FIG. 3B illustrate examples of a computing server that can use techniques of the present disclosure.
Figure 3B:
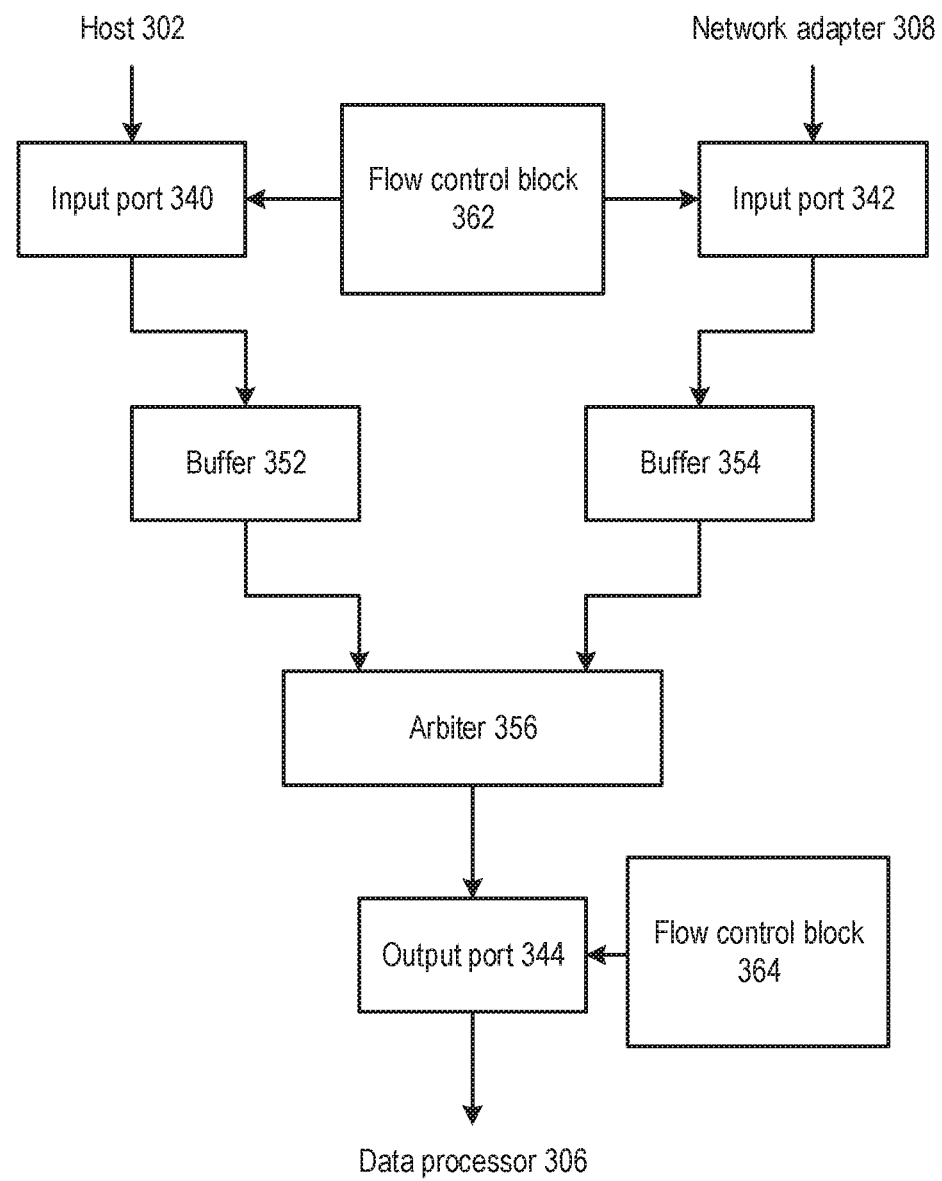

FIG. 3A and FIG. 3B illustrate an example of a server computer 300 that can implement communication stack 200. Referring to FIG. 3A, server computer 300 includes a host 302, which includes a host processor 303 and a host memory 304, a hardware data processor 306, and a network adapter 308. Host processor 303, host memory 304, hardware data processor 306, and network adapter 308 can be interconnected via an interconnect 310, such as a PCIE interconnect implemented as a root complex switch. Server computer 300 can implement any one of nodes 102a-h of FIG. 1A, where multiple server computers 300 can be interconnected to form computing cluster 100 of FIG. 1A.

Hardware data processor 306 can include a computing engine 312 to provide dedicated computing resources to support certain data processing applications. In some examples, computing engine 312 may include a neural network hardware accelerator. Hardware data processor 306 also includes a local memory, which includes a local on-chip memory 314 (on the same chip as computing engine 312) and a local off-chip memory 316. Local on-chip memory 314 may include different types of on-chip memory such as, for example, static random access memory (SRAM), registers, and flops. Local off-chip memory 316 may include different types of off-chip memory such as, for example, dynamic random access memory (DRAM), high-bandwidth memory (HBM), and non-volatile memory, such as storage class memory (SCM) and flash memory.

Local on-chip memory 314 and local off-chip memory 316 can form a hierarchical memory system to support computing engine 312. Specifically, local on-chip memory 314 can operate as a buffer to store temporary outputs from computation engine 312 which can be fed back into computation engine 312. For example, in a case where computation engine 312 implements a neural network, local on-chip memory 314 can store the intermediate outputs from the forward propagation operation of a neural network layer, and can fetch the intermediate outputs to computation engine 312 as inputs to the forward propagation operation of the next neural network layer. On the other hand, after the forward propagation operations for all neural network layers complete and the final outputs are computed, the final outputs can be written back into local off-chip memory 316. Local off-chip memory 316 can also store other data that are to be fetched to other components within server computer 300, such as to host 302 and network adapter 308.

In addition, hardware data processor 306 also includes a controller 318 to manage the operations of data processor 306. Controller 318 further includes a DMA engine 320. DMA engine 320 can provide access to local off-chip memory 316 via DMA operations. Controller 318 further includes an access queue (not shown in FIG. 3A) to store read and write descriptors received from, for example, host 302, network adapter 308, or other devices connected to interconnect 310. Controller 318 can fetch the descriptors from the access queue and perform read/write operations to off-chip memory 316 based on the descriptors, as described above in FIG. 2B.

Host processor 303 of host 302 can execute an operating system kernel as well as other applications that use the computation resources provided by hardware data processor 306. For example, host processor 303 can execute a training application that controls hardware data processor 306 to perform batches of distributed training operation 140. As another example, host processor 303 can execute an image recognition application that uses hardware data processor 306 to perform an inferencing operation using a neural network with weights obtained from distributed training operation 140. In addition, host memory 304 provides memory resources to support the operation of host processor 303, as well as hardware data processor 306. For example, host memory 304 can store the input training data, the input data for the inference operation, etc., and supply the data to hardware data processor 306 via, for example, DMA operations. Host memory 304 can include an on-chip or an off-chip memory, such as SRAM, DRAM, HBM, non-volatile memory, such as storage class SCM, and flash memory.

Network adapter 308 can include a physical port 322, a controller 324, and a local memory 326. Physical port 322 connects network adapter 308 to network fabric 330, via which network adapter 308 can send and receive packets. Controller 324 can implement similar components of network adapter 208a/b of FIG. 2A to implement communication stack 200, such as a send queue, a receive queue, and a completion queue (not shown in FIG. 3A), to manage transmission and reception of packets via port 322. Local memory 326 can support the operations of controller 324 by, for example, providing a temporary storage for received packet data and/or data to be packetized.

Transfer of data between data processor 306 and network adapter 308 can be performed using DMA operations via interconnect 310. To transmit data packets to network fabric 330 (e.g., in response to a WQE being posted in the send queue), controller 324 can send read descriptors to data processor 306 via interconnect 310. DMA engine 320 of data processor 306 can execute the read descriptors by fetching the requested data and sending the requested data to local memory 326 for storage. Moreover, to process data packets received from network fabric 330 (e.g., in response to a WQE being posted in the receive queue), controller 324 can fetch the receive data from local memory 326 and send write descriptors and the fetched data to data processor 306 via interconnect 310. DMA engine 320 of data processor 306 can execute the write descriptors by storing the fetched data at local off-chip memory 316. The data can then be moved to local on-chip memory 314 when the data is needed by computation engine 312. In a case where interconnect 310 is based on the PCIE specification, the base address of local off-chip memory 316 can be stored in Base Address Registers (BARs) accessible by network adapter 308. Network adapter 308 can obtain the base address of local off-chip memory 316 from the BAR and generate the read and write descriptors, including the base address as a source address (for read descriptor) or as a destination address (for write descriptor).

FIG. 3B illustrates an example of internal components of interconnect 310 which can be implemented as a root-complex switch. As described above, interconnect 310 can provide connectivity among host 302, network adapter 308, and hardware data processor 306. As shown in FIG. 3B, interconnect 310 includes multiple ports such as, for example, an input port 340, an input port 342, and an output port 344. Input port 340 can be connected to host 302, input port 342 can be connected to network adapter 308, whereas output port 344 can be connected to hardware data processor 306. Although not shown in FIG. 3B, it is understood that host 302 and network adapter 308 are also connected to other output ports, whereas data processor 306 is also connected to other input ports. Arbiter 356 can select, based on any arbitration algorithm (e.g., a round-robin scheme), the order by which input ports 340 and 342 forward data to output port 344. Through input ports 342 and 344, arbiter 356, and output port 344, both host 302 and network adapter 308 can transmit data to hardware data processor 306, albeit at different times.

Additionally, interconnect 310 includes flow control blocks 362 and 364, as well as buffers 352 and 354 to implement a port-level flow control mechanism to control the rate of flow of traffic at the input and output ports. Specifically, the port-level flow control mechanism may be implemented to, for example, police/shape the volume of communication traffic from host processor 303 and network adapter 308 into hardware data processor 306, to prevent any one of host processor 303 or network adapter 308 from dominating the transmission of data to hardware data processor 306. To support the traffic shaping, flow control block 362 can implement, for example, a credit system to keep track of a volume of data that has flown through each of input port 340 and 342. Flow control block 362 can stop an input port from letting data into interconnect 310 if the input port runs out of the requisite credit to transmit the data. In addition, output port 344 is controlled by flow control block 364. Flow control block 364 can also implement a credit system to limit the rate at which hardware data processor 306 receives data through output port 344. The flow control at output port 344 can be arranged to accommodate, for example, bandwidth/speed limitation of local memory 314 of hardware data processor 306. Buffers 352 and 354 can buffer data received from, respectively, input ports 340 and 342 while the data are gated from output port 344 by flow control block 364 and/or arbiter 356.

Although the RDMA protocol implemented in computing system 300 can reduce the data transfer latency between network adapter 308 and hardware data processor 306 by removing involvement from host 302, various memory access operations and message exchange operations at the computing device prior to the data transfer operation can incur substantial latencies, which can increase the overall completion time of the distributed computation operations.

Figure 4A:
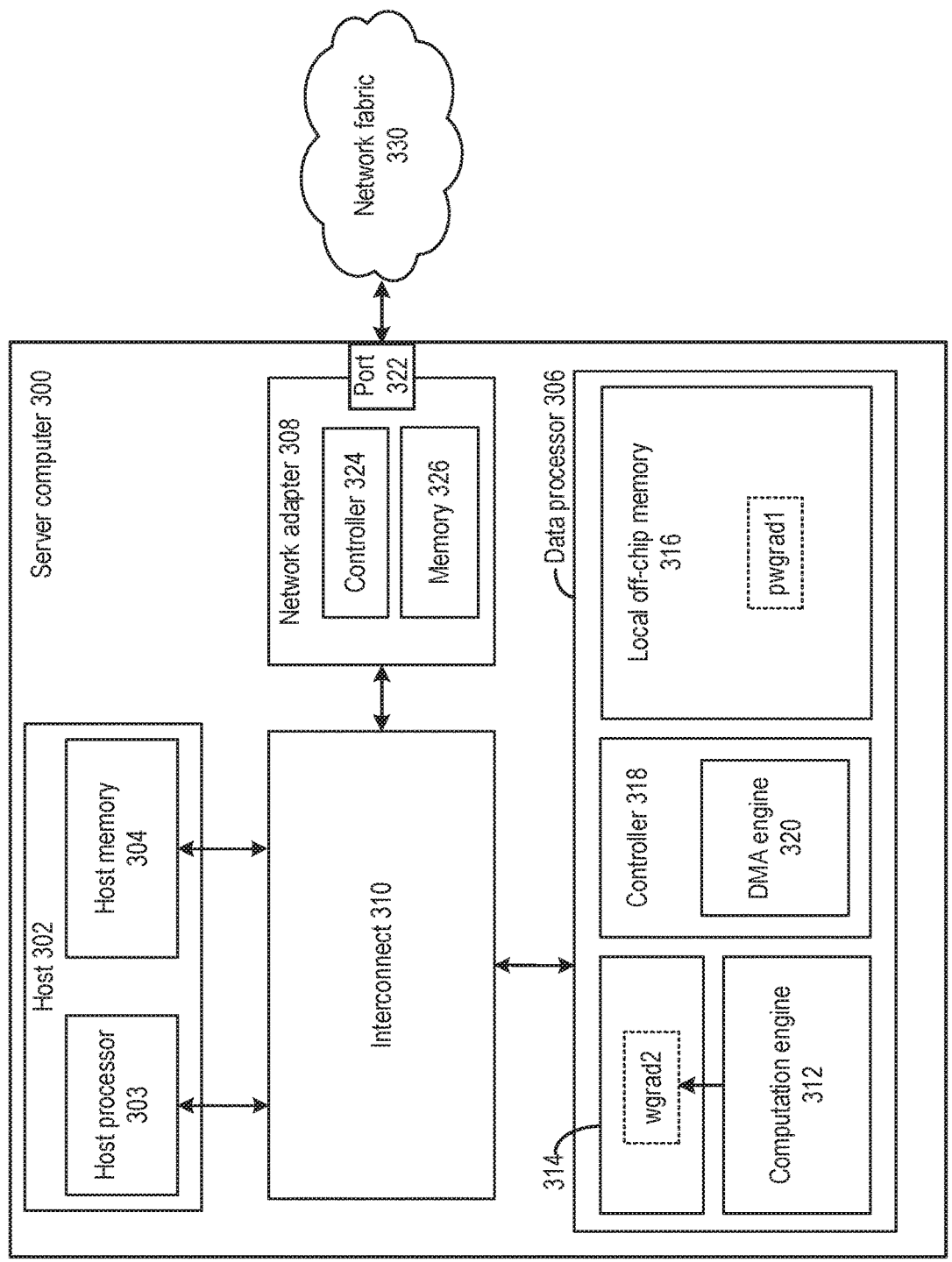
FIG. 4A, FIG. 4B, FIG. 4C, FIG. 4D, and FIG. 4E illustrate examples of a data transfer operation performed by the example computing server of FIG. 3A-FIG. 3B.

FIG. 4A-FIG. 4D illustrate an example sequence of operations involved in the transmission of partial averaged weight gradients by server computer 300. As shown in FIG. 4A, server computer 300 can implement node 102c. Computation engine 312 can receive an instruction from host 302 to perform a backward propagation operation to generate a set of local weight gradients wgrad2, and store wgrad2 at local on-chip memory 314. In addition, local off-chip memory 316 can store a set of partial averaged weight gradients pwgrad1, which can be received from node 102b as discussed in FIG. 1E and stored into local off-chip memory 316 by network adapter 308 via a DMA operation.

Figure 4B:
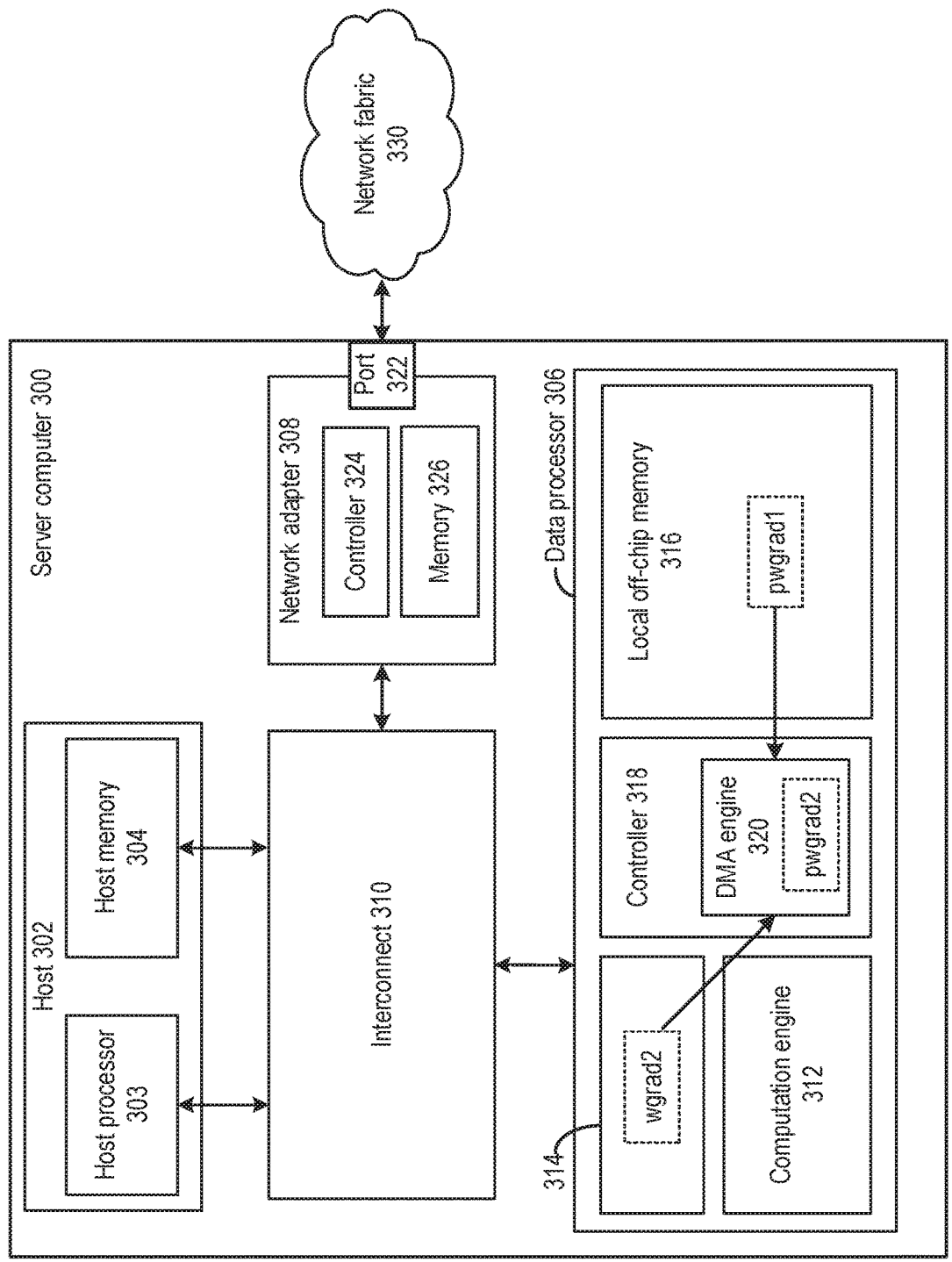

In FIG. 4B, upon detecting that local weight gradients wgrad2 are stored at local on-chip memory 314, controller 318 can store one or more write descriptors in an access queue (e.g., access queue 262 of FIG. 2B), with the data move descriptor pointing to local off-chip memory 316. DMA engine 320 can execute the write descriptors by performing an all-reduce operation 162b to generate a set of updated partial averaged weight gradients pwgrad2. DMA engine 320 can fetch local weight gradients wgrad2 from local on-chip memory 314, fetch partial averaged weight gradients pwgrad1 from local off-chip memory 316, and then perform the all-reduce operation (e.g., averaging) on weight gradients wgrad2 and pwgrad1 to generate weight gradients pwgrad2.

Figure 4C:
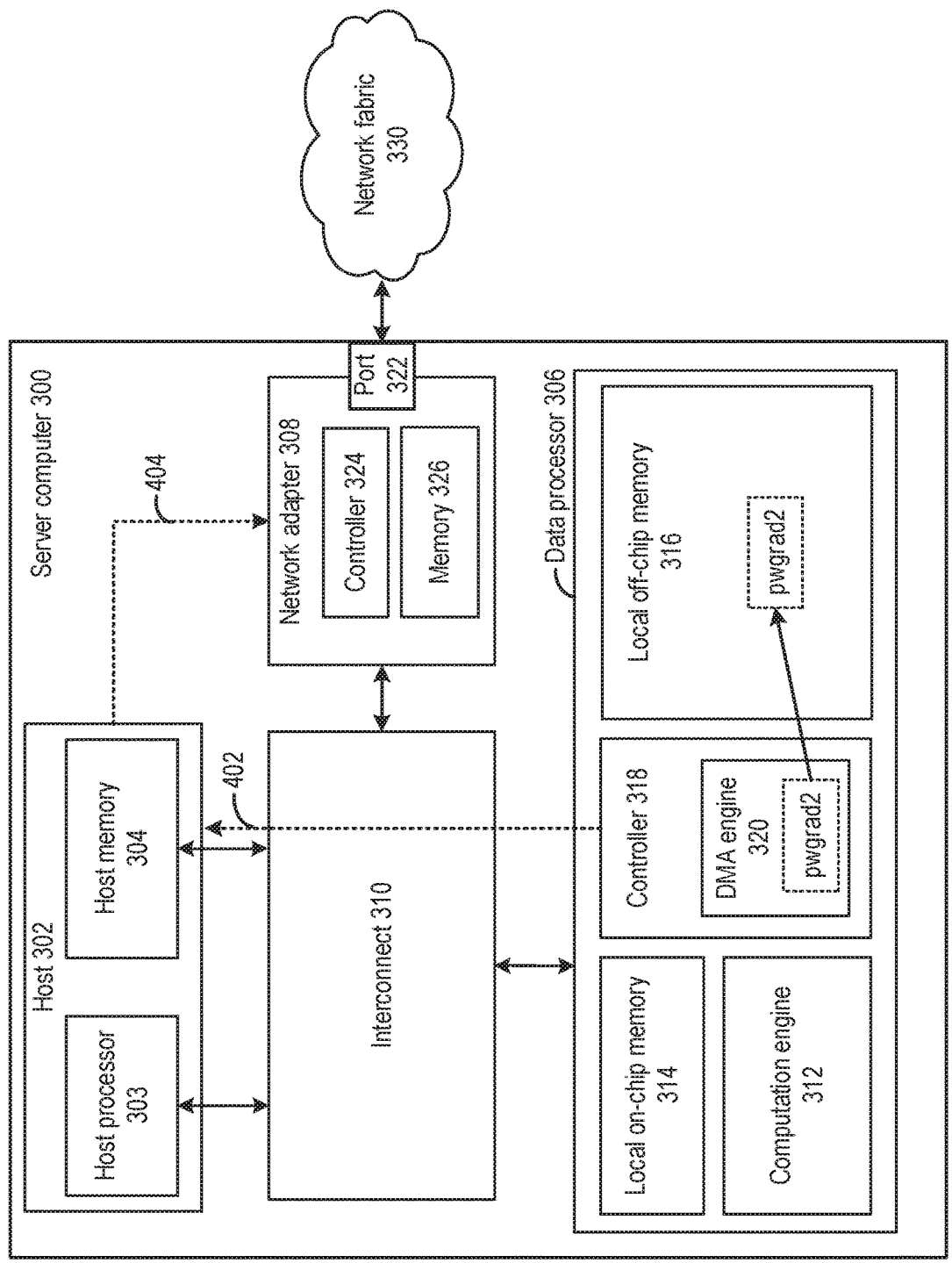

In FIG. 4C, upon generating updated partial averaged weight gradients pwgrad2, DMA engine 320 can write pwgrad2 back to local off-chip memory 316 according to the write descriptors. After writing weight gradients pwgrad2 back to local off-chip memory 316, controller 318 can transmit a notification 402 to host 302 to indicate that weight gradients pwgrad2 is ready to be fetched. Upon receiving notification 402, host 302 can transmit a notification 404 to network adapter 308 to trigger network adapter 308 to fetch weight gradients pwgrad2 from local off-chip memory 316. In some examples, notifications 402 and 404 can be in the form of messages transmitted via interconnect 310. In some examples, notifications 402 and 404 can be in the form of interrupt signals.

Figure 4D:
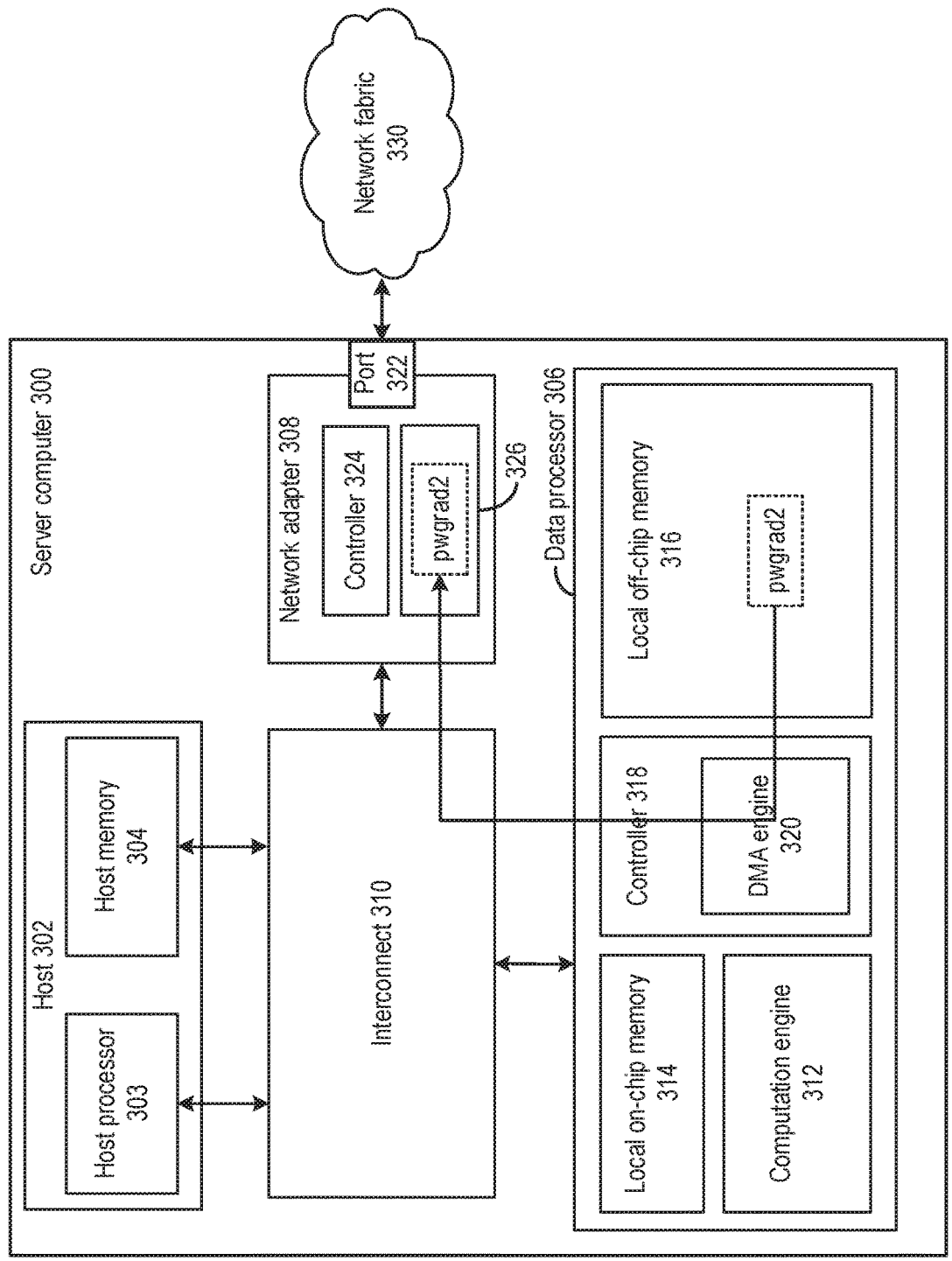

In FIG. 4D, upon receiving notification 404 from host 302, network adapter 308 can fetch updated partial averaged weight gradients pwgrad2 from local off-chip memory 316. To fetch weight gradients pwgrad2, network adapter 308 can transmit one or more read descriptors, having source address based on the base address of local off-chip memory 316, and transmit the read descriptors to data processor 306. DMA engine 320 can execute the read descriptors by performing memory read operations at local off-chip memory 316 to fetch weight gradients pwgrad2, followed by transmitting weight gradients pwgrad2 to network adapter 308. Network adapter 308 can then write weight gradients pwgrad2 at local memory 326 and then fetch weight gradients pwgrad2 from local memory 326 to generate packets for transmission via port 322.

The sequence of operations as described in FIG. 4A-FIG. 4D can introduce substantial latencies to the all-reduce operation. Specifically, the write-back operation of weight gradients pwgrad2 to local off-chip memory 316 can incur substantial latencies, since local off-chip memory 316 has limited bandwidth. The bandwidth can be limited due to, for example, limited memory device bandwidth, and limited bandwidth in the off-chip link between local off-chip memory 316 and DMA engine 320. Because of the limited bandwidth, transfer of the weight gradients pwgrad2 from DMA engine 320 to local off-chip memory 316, as well as memory operations to write the weight gradients to local off-chip memory 316, can incur substantial latencies.

Besides limited bandwidth, there are other latencies introduced to the data transfer operation as a result of the write-back operations. For example, hardware data processor 306 can only store a limited number of outstanding read descriptors from network adapter 308. As a result, DMA engine 320 can only execute the read descriptors and transfer the data to network adapter 308 in batches. The wait time between batches can further delay the transfer of data from the hardware data processor to the network adapter, as well as the sending of packets over the network. In addition, as network adapter 308 fetches weight gradients pwgrad2 from hardware data processor 306 after receiving notification 404 from host 302, which sends notification 404 after receiving notification 402 from hardware data processor 306, the transmission of notifications 402 and 404 across interconnect 310, as well as the generation of notification 404 by host 302, can further delay the fetching of weight gradients pwgrad2 and subsequent transmission of packets by network adapter 308. For example, the flow control blocks and arbiter in interconnect 310 can delay storing of messages and memory write/read data into the buffer, as well as the forwarding of the messages and memory write/read data from the buffer to the output port, all of which can add delay to the transmission of message and memory write/read data across interconnect 310.

Figure 4E:
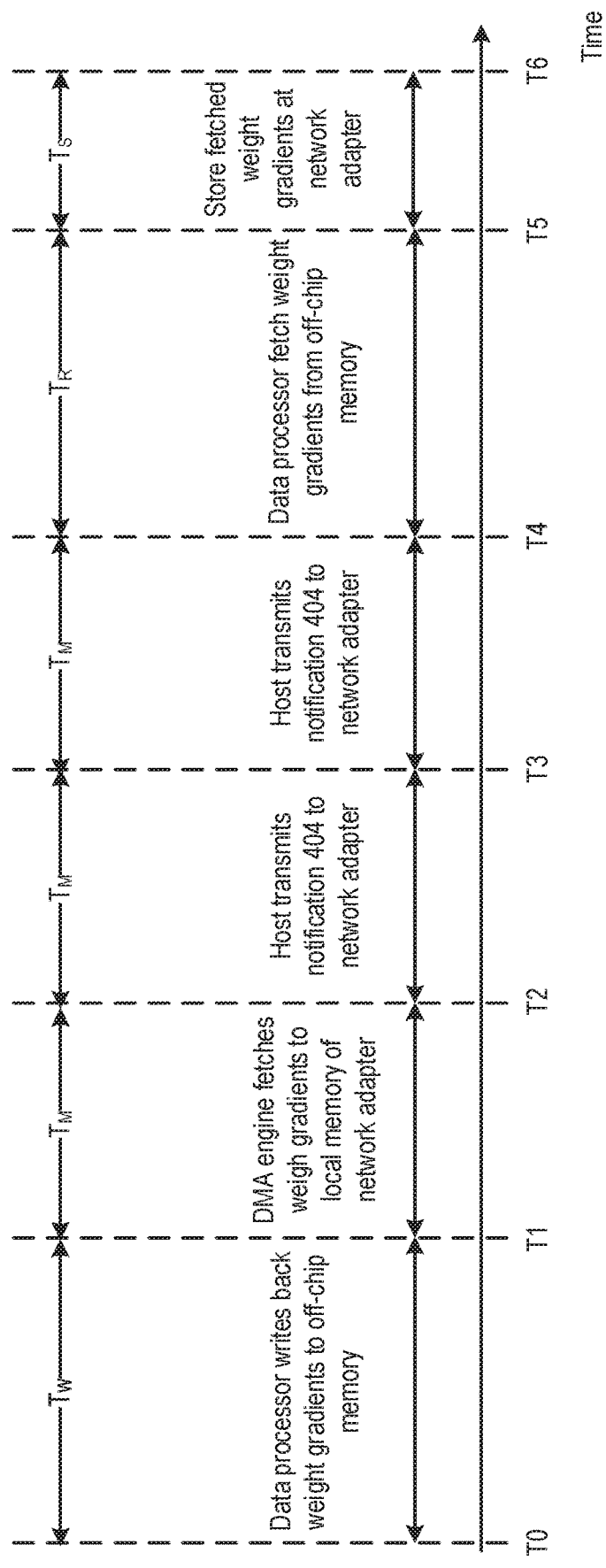

FIG. 4E illustrates an example timing diagram 410 of the example sequence of operations of FIG. 4A-FIG. 4D. Between times T0 and T1, hardware data processor 306 writes back updated weight gradients pwgrad2 to local off-chip memory 316. The write-back operation can take a duration of $T_W$ due to the limited bandwidth of the off-chip memory. Between times T1 and T2, hardware data processor 306 transmits notification 402 to host 302; between times T2 and T3, host 302 transmits notification 404 back to network adapter 308; whereas between times T3 and T4, network adapter 308 transmits read descriptors to hardware data processor 306 to fetch the weight gradients pwgrad2 from local off-chip memory 316, with each transmission taking a duration of $T_M$ due to transit delay across interconnect 310. Between times T4 and T5, hardware data processor 306 executes the read descriptors to fetch the weight gradients pwgrad2 and transmit the weight gradients pwgrad2 to network adapter 308. The fetching and transmission of weight gradients pwgrad2 can take a duration of $T_R$ due to the limited bandwidth of local off-chip memory 316, as well as wait time between batch execution of read descriptor execution. Between times T5 and T6, network adapter 308 can store the fetched weight gradients pwgrad2 at its local memory, which takes a duration of $T_S$, including the time to fetch the weight gradients from the internal buffer of interconnect 310, as well as the time to store the fetched weight gradients at local memory 326. The total time between the generation of weight gradients pwgrad2 and the storage of the weight gradients at the local memory of network adapter 308, between times T0 and T6, can introduce substantial delay to the all-reduce and weight gradients exchange operations. The overall performance of the distributed computing system in performing the training operation can become degraded as a result.

Figure 5A:
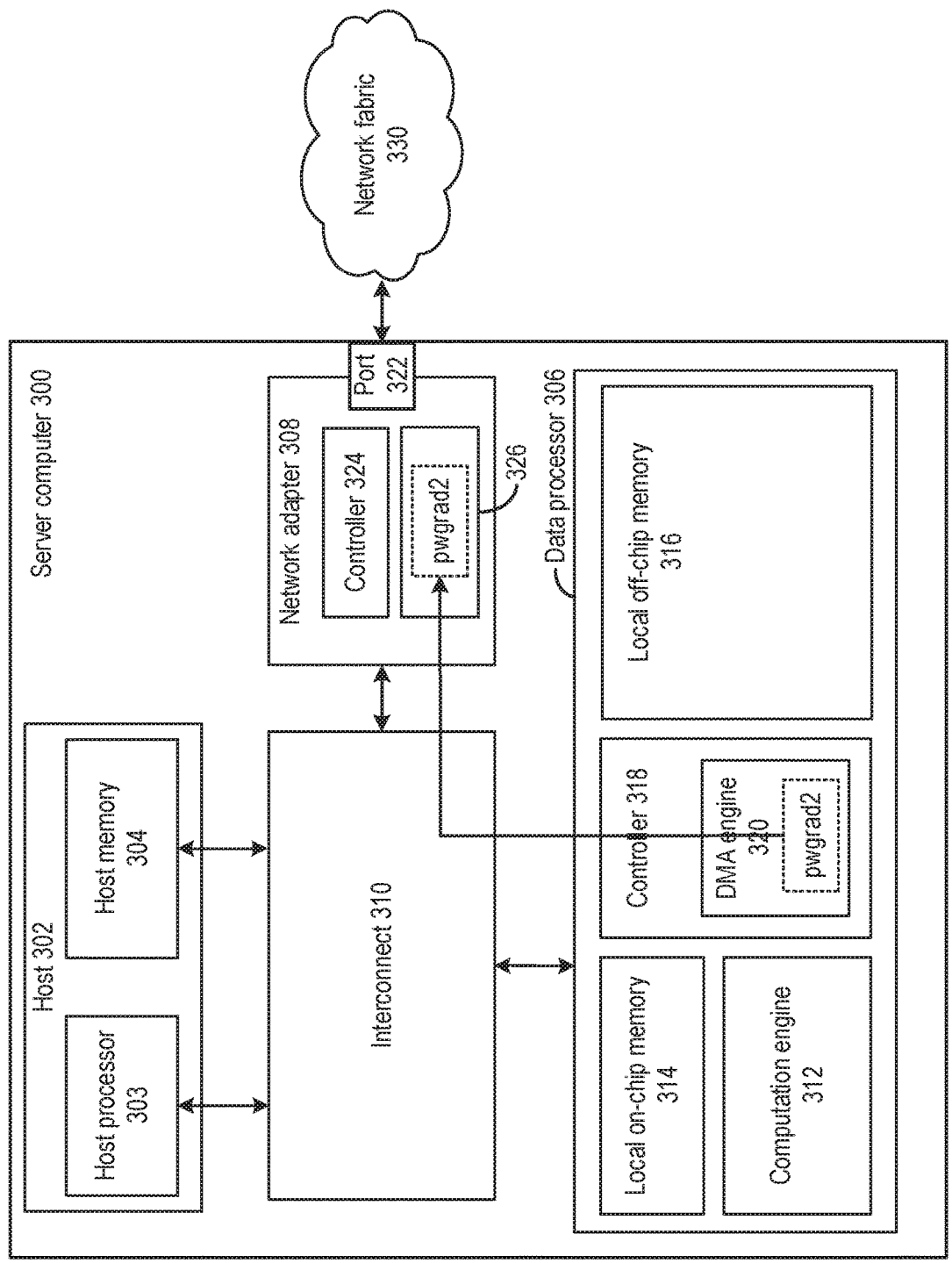
FIG. 5A, FIG. 5B, FIG. 5C, and FIG. 5D illustrate examples of a data transfer operation performed by the example computing server of FIG. 3A-FIG. 3B, according to examples of the present disclosure.

FIG. 5A, FIG. 5B, FIG. 5C, and FIG. 5D illustrate an example of a data transfer operation having a reduced latency. As shown in FIG. 5A, after generating weight gradients pwgrad2, instead of writing the updated weight gradients back to local off-chip memory 316, DMA engine 320 can transfer the updated weight gradients directly to local memory 326 of network adapter 308.

As described in FIG. 4B, DMA engine 320 can fetch local weight gradients wgrad2 from local on-chip memory 314, fetch partial averaged weight gradients pwgrad1 from local off-chip memory 316, and then perform an all reduce operation (e.g., averaging) on weight gradients wgrad2 and pwgrad1 to generate weight gradients pwgrad2. DMA engine 320 can also generate memory write requests that point to the base address of local memory 326 of network adapter 308. Specifically, controller 318 of hardware data processor 306 can have access to the base address of local memory 326 of network adapter 308. In a case where interconnect 310 implements a PCIE root-complex, the base address can be accessible from, for example, a Base Address Register (BAR) of the PCIE root-complex.

In some examples, a pre-determined memory region of local memory 326 can be allocated and accessible only to data processor 306 for writing data into. The access control can be implemented in various ways. For example, a special BAR register of the PCIE root-complex can store the base address of the pre-determined memory region that is accessible only by a limited number of entities, such as data processor 306 or an administrator entity (e.g., a hypervisor, a management server, host 302, etc.). As another example, the memory controller of network adapter 308 can be programmed to accept write instructions to only a limited number of entities, including data processor 306.

Referring back to FIG. 5A, after generating the memory write requests, DMA engine 320 can transmit the weight gradients and the memory write requests to network adapter 308. The weight gradients may be buffered at an internal buffer of interconnect 310. Upon receiving the memory write requests, a memory controller of network adapter 308 (not shown in figures) can fetch the weight gradients from the internal buffer of interconnect 310 and store the weight gradients at local memory 326 according to the memory write requests. When network adapter 308 is ready to transmit packets, network adapter 308 can fetch the weight gradients from local memory 326 and generate packets for transmission via port 322. After transmitting the packets and receiving acknowledgments that the recipient device has received the packets, network adapter 308 can remove the weight gradients from local memory 326.

Figure 5B:
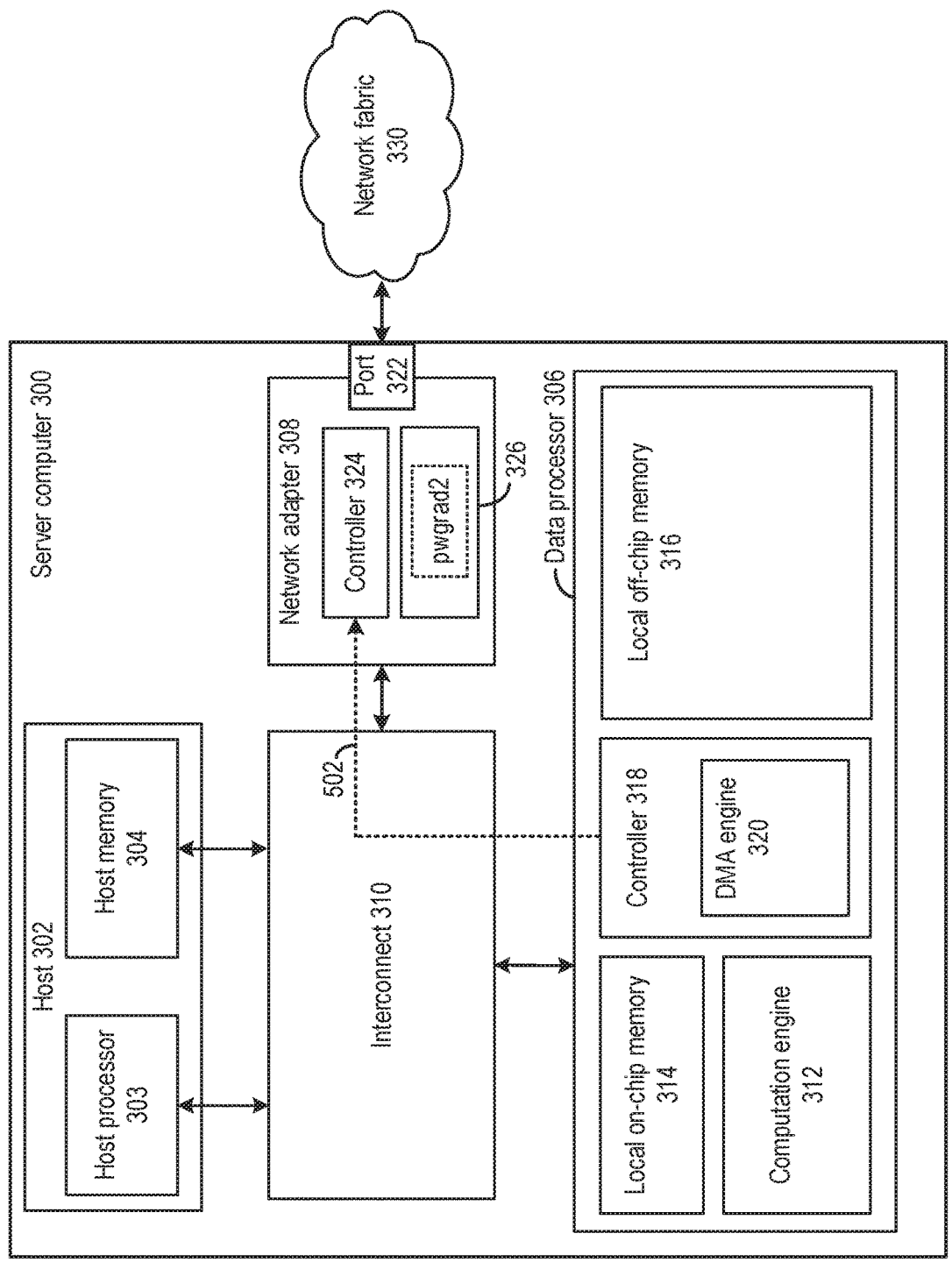

In some examples, network adapter 308 can detect that memory write requests are received and stored in an access queue of network adapter 308 (not shown in FIG. 5A), and fetch the weight gradients from the internal buffer of interconnect 310 based on the detection. In some examples, as shown in FIG. 5B, hardware data processor 306 can transmit a notification 502 (e.g., an interrupt signal) to network adapter 308 to indicate that hardware data processor 306 has completed the transfer of the weight gradients to interconnect 310. Notification 502 can trigger network adapter 308 to fetch the weight gradients from the internal buffer of interconnect 310 based on the write requests. The network adapter 308 may also perform a flush operation to ensure that all the weight gradients stored in the internal buffer from the hardware data processor have been fetched, upon receiving notification 502.

In some examples, a flow control mechanism can be implemented between DMA engine 320 of data processor 306 and network adapter 308 to control the transmission of the weight gradients to local memory 326 of network adapter 308. The flow control mechanism can prevent DMA engine 320 sending weight gradients to local memory 326 when local memory 326 is full. This can happen when, for example, controller 324 is overloaded and cannot fetch the weight gradients from local memory 326 for transmission or network fabric 330 is unable to transmit the weight gradients.

Figure 5C:
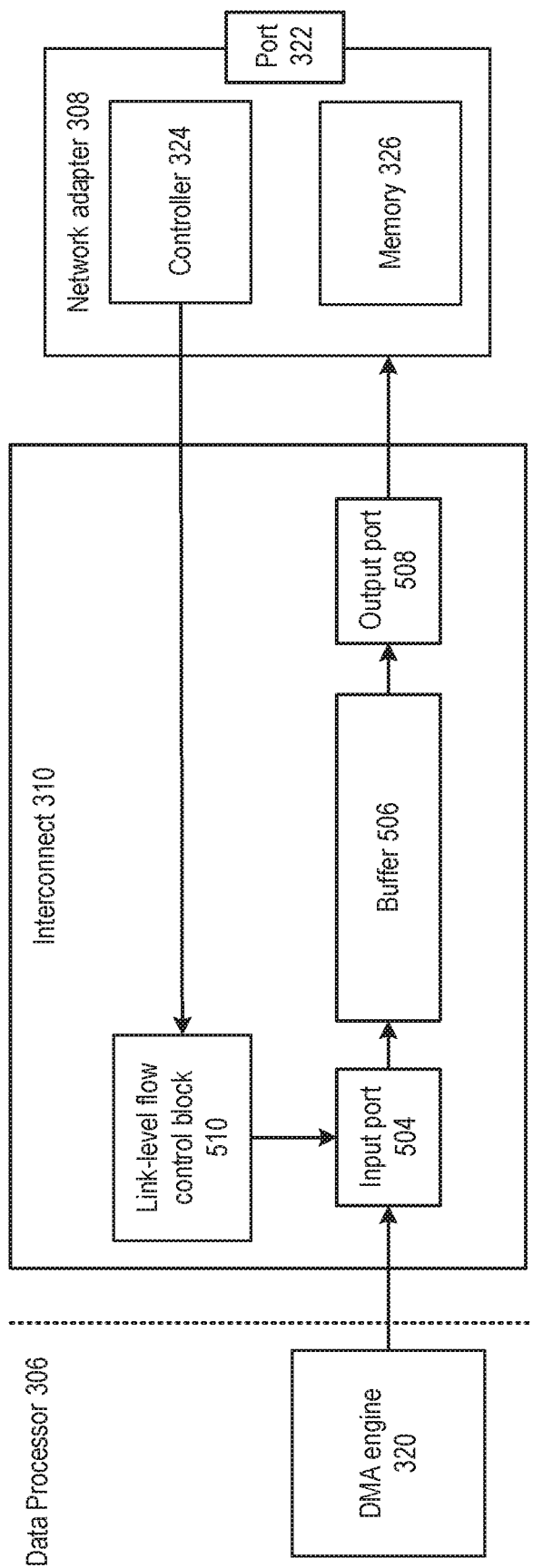

In some examples, the aforementioned flow control mechanism can be implemented in interconnect 310. FIG. 5C illustrates an example flow control mechanism implemented in interconnect 310 between DMA engine 320 and network adapter 308. As shown in FIG. 5C, interconnect 310, in addition to the components shown in FIG. 3B, may include an input port 504, a buffer 506, an output port 508, and a link-level flow control block 510. Input port 504 can be connected to DMA engine 320 of data processor 306, whereas output port 508 can be connected to network adapter 308. DMA engine 320 can transmit, via input port 504, weight gradients to interconnect 310, which can buffer the weight gradients at buffer 506 before transmitting the weight gradients to network adapter 308 via output port 508.

Additionally, link-level flow control block 510 can perform a link-level flow control mechanism between DMA engine 320 and network adapter 308. The link-level flow control mechanism can be configured to specifically control the flow of write data (e.g., weight gradients) from DMA engine 320 to memory 326 of network adapter 308, but not other data (e.g., messages targeted at controller 324) that flow through input port 504 and output port 508. Link-level flow control block 510 can operate with other flow control blocks which implement a port-level flow control mechanism (e.g., flow control block 362 of FIG. 3B) to determine whether input port 504 accepts write data from DMA engine 320 based on a state of memory 326/controller 324. For example, if memory 326 is approaching capacity because network adapter 308 cannot delete weight gradients in memory 326 (e.g., controller 324 has transmitted the weight gradients or has not received acknowledgments for transmission of the weight gradients) and cannot accept new weight gradients, link-level flow control block 510 can prevent input port 504 from receiving new weight gradients and/or forwarding the new weight gradients to buffer 506, regardless of whether the port-level flow control mechanism allows the new weight gradients to go through input port 504. On the other hand, if memory 326 has capacity for new weight gradients, and if the port-level flow control mechanism also permits, input port 504 can accept new weight gradients and forward the new weight gradients to buffer 506.

Link-level flow control block 510 can employ various techniques to perform link-level flow control. For example, link-level flow control block 510 can employ a credit system. Each time input port 504 forwards write data to buffer 506, credit can be deducted based on the quantity of write data forwarded. When there is no available credit, or the quantity of write data to be forwarded is more than the available credit, input port 504 can reject the write data from DMA engine 320. Link-level flow control 510 can replenish the available credit upon receiving an indication (e.g., a message) that memory 326 has capacity for new data.

Figure 5D:
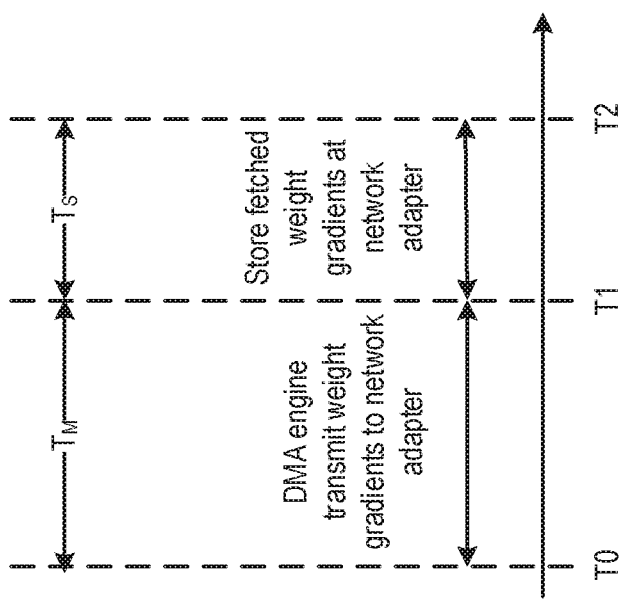

FIG. 5D illustrates an example timing diagram 520 of the data transfer operation shown in FIG. 5A. As shown in FIG. 5D, between times T0 and T1, DMA engine 320 transmits weight gradients pwgrad2 to network adapter 308 via interconnect 310. The duration of time between T0 and T1 can be equal to $T_M$ due to the transit delay across interconnect 310. Between times T1 and T2, network adapter 308 can store the fetched weight gradients pwgrad2 at its local memory, which takes a duration of $T_S$, including the time to fetch the weight gradients from the internal buffer of interconnect 310, as well as the time to store the fetched weight gradients at local memory 326. Comparing with timing diagram 410 of FIG. 4E, the total time between the generation of weight gradients pwgrad2 and the storage of the weight gradients at the local memory of network adapter 308, between times T0 and T2, can be substantially decreased, which can substantially speed up the all-reduce and weight gradients exchange operations. The overall performance of the distributed computing system in performing the training operation can be improved as a result.

Figure 6A:
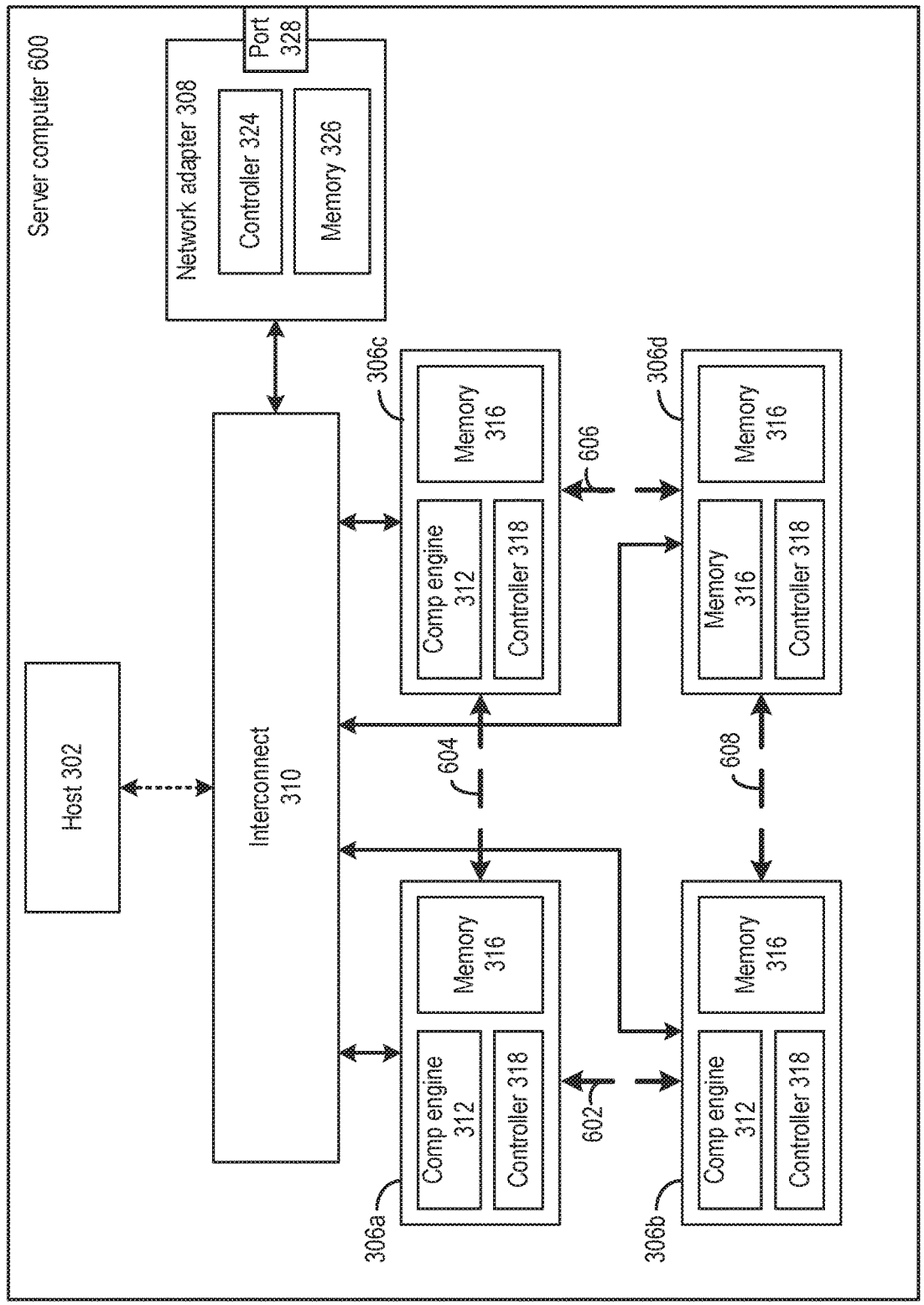
FIG. 6A and FIG. 6B illustrate another example of a computing server and a data transfer operation performed by the computing server, according to examples of the present disclosure.

In some examples, hardware data processor 306 can be directly connected to a second hardware data processor via a peer-to-peer interconnect (e.g., a peer-to-peer PCIE interconnect), and the data transfer techniques described in FIG. 5A can be used to improve data transfer over the peer-to-peer interconnect. FIG. 6A illustrates an example server computer 600 comprising multiple hardware data processors 306a, 306b, 306c, and 306d. Each of hardware data processors 306a, 306b, 306c, and 306d can be connected with host 302 and network adapter 308 via interconnect 310. In addition, the hardware data processors can be interconnected via peer-to-peer interconnects. For example, hardware data processor 306a can be connected with hardware data processor processors 306b and 306c via, respectively, peer-to-peer interconnects 602 and 604. In addition, hardware data processor 306b can also be connected with hardware data processor 306d via a peer-to-peer interconnects 608, whereas hardware data processor 306d can also be connected with hardware data processor 306c via a peer-to-peer interconnect 606. In server computer 600, hardware data processors 306a, 306b, 306c, and 306d can also form a ring topology, in which hardware data processors 306a generates an initial set of partial weight gradients, which then propagate and get updated through hardware data processors 306b, 306d, and 306c via the peer-to-peer interconnects. Hardware data processors 306c can then transmit a final set of partial weight gradients to memory 326 of network adapter 308 for transmission using the techniques described in FIG. 5A and FIG. 5B.

In addition, within server computer 300, a hardware data processor can also transmit weight gradients to another hardware data processor via the peer-to-peer interconnect using similar techniques described in FIG. 5A and FIG. 5B.

Figure 6B:
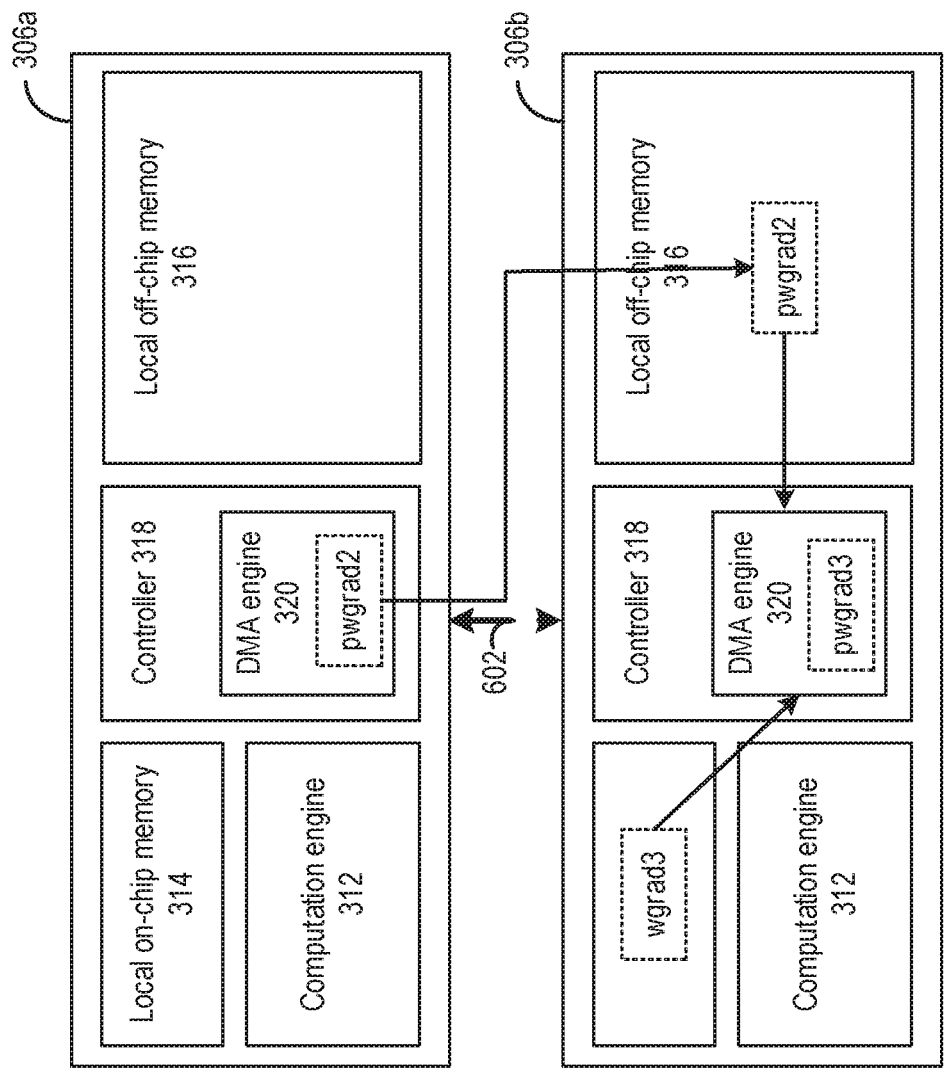

Specifically, as shown in FIG. 6B, DMA engine 320 of hardware data processor 306a can generate partial weight gradients pwgrad2 as well as memory write requests having destination addresses pointing to local off-chip memory 316 of hardware data processor 306b. Hardware data processor 306b can then send the memory write requests and partial weight gradients pwgrad2 to hardware data processor 306b via peer-to-peer interconnect 602. Upon receiving the memory write requests and the partial weight gradients, a memory controller of hardware data processor 306b (not shown in the figures) can write the partial weight gradients to its local off-chip memory 316 according to the memory write instructions. DMA engine 320 of hardware data processor 306b can then fetch locally generated weight gradients wgrad3 from its local on-chip memory 314 and partial weight gradients pwgrad2 from its local off-chip memory 316 and perform an all-reduce operation to compute partial weight gradients pwgrad3.

In FIG. 5A-FIG. 6B described above, DMA engine 320 of hardware data processor 306 and network adapter 308 can also use the RDMA protocol to receive remote data over network fabric 330. For example, network adapter 308 in FIG. 5A-FIG. 6B may also implement a queue pair comprising a send queue and a receive queue as shown in FIG. 2A. When the network adapter receives a set of packets containing the remote data (e.g., weight gradients from another worker node), a WQE can be posted in the receive queue. The network adapter can then process the WQE by sending write descriptors and the remote data to the hardware data processor via interconnect 310. The DMA engine at the hardware data processor can then execute the write descriptors by fetching the remote data from the internal buffer of the root-complex interconnect. As another example, the DMA engine of the hardware data processor and the network adapter can also use the RDMA protocol to send other types of output data generated by the computation engine, such as the set of final weight gradients generated by the final node/final hardware data processor in a ring (e.g., node 102n of FIG. 1E, hardware data processor 306c of FIG. 6B). In such example, the set of final weight gradients can be written back to the off-chip local memory of the hardware data processor of the final node. The controller can post a WQE at the send queue of the network adapter. The controller can also send a doorbell interrupt signal to the network adapter, which prompts the network adapter to process the WQE at the send queue to fetch the set of final weight gradients by sending read descriptors to the hardware data processor. The DMA engine can then process the read descriptors by sending the set of final weight gradients to the network adapter's local memory via the root-complex interconnect. The network adapter can then send the set of final weight gradients to other nodes in the ring. Meanwhile, the hardware data processor of the final node can also fetch the set of final weight gradients from its off-chip local memory, and use the set of final weight gradients to update the weights.

Figure 7:
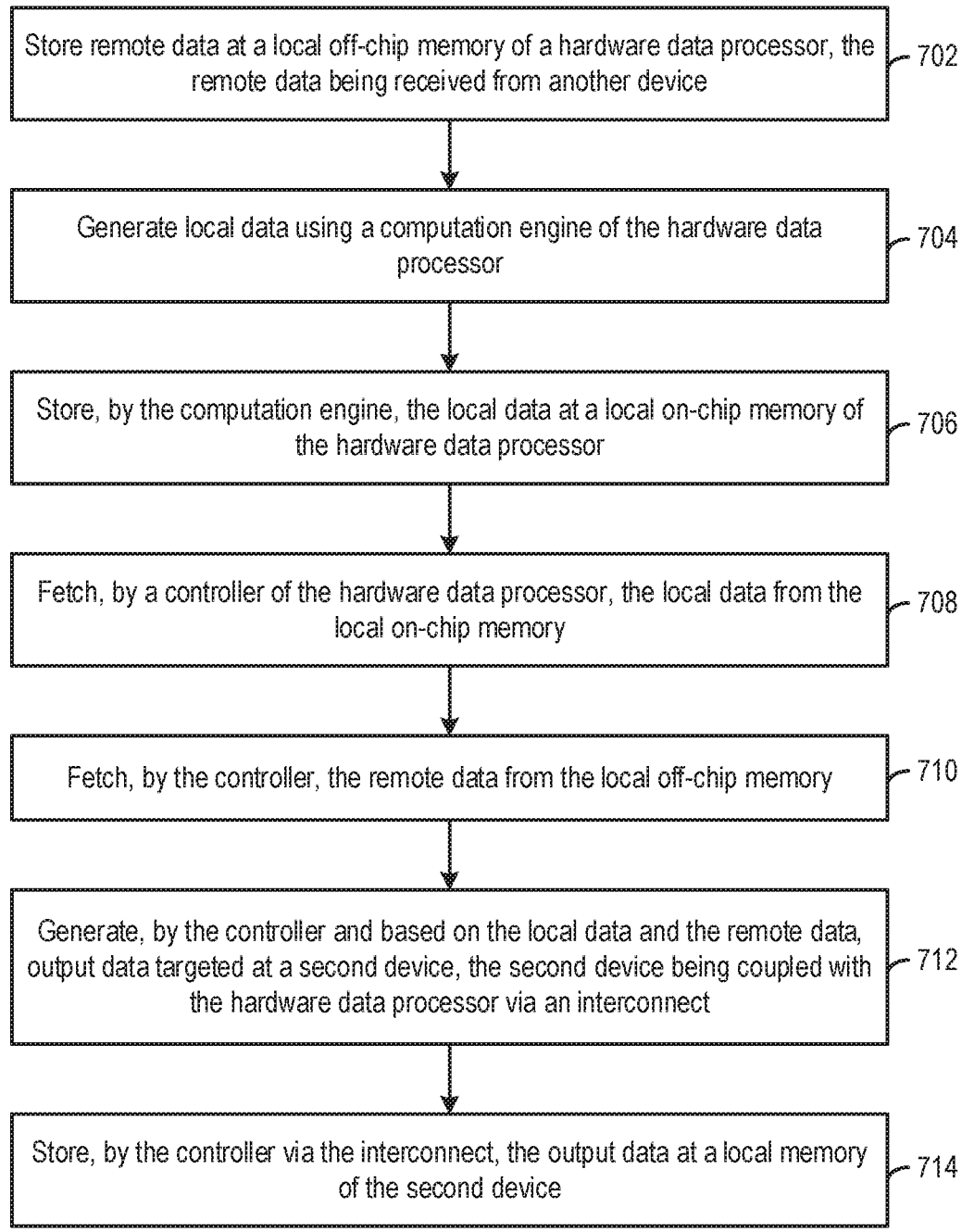
FIG. 7 illustrates an example of a method of performing data transfer, according to examples of the present disclosure.

FIG. 7 illustrates a method 700 of transferring data from a hardware data processor, such as hardware data processor 306, to a second device over an interconnect (e.g., interconnect 310), which can be a PCIE root-complex switch or a PCIE peer-to-peer link. The hardware data processor can be part of a node (e.g., a computer server) which forms a ring topology with other nodes. The second device can include a network adapter (e.g., network adapter 308), another hardware data processor (e.g., one of hardware data processors 306a-306d of FIG. 6A), etc. Method 700 can be performed by hardware data processor 306.

Method 700 starts with step 702, in which hardware data processor 306 stores remote data at a local off-chip memory (e.g., local off-chip memory 316) of the hardware data processor. The remote data may include, for example, partial averaged weight gradients received from another worker node received over the network via the network adapter. Local off-chip memory 316 may include different types of off-chip memory such as, for example, dynamic random access memory (DRAM), high-bandwidth memory (HBM), and non-volatile memory, such as storage class memory (SCM) and flash memory.

In step 704, hardware data processor 306 generates local data using a computation engine (e.g., computation engine 312). The local data may include, for example, local weight gradients generated by computation engine 312 in a backward propagation operation.

In step 706, the computation engine of hardware data processor 306 stores the local data at a local on-chip memory (e.g., local on-chip memory 314) of hardware data processor 306. Local on-chip memory 314 can provide temporary storage for inputs and outputs of the computation engine. Local on-chip memory 314 may include different types of on-chip memory such as, for example, static random access memory (SRAM), registers, and flops.

In step 708, a controller of hardware data processor (e.g., controller 318) fetches the local data from the local on-chip memory. In some examples, the controller may include a direct access engine (DMA) engine, such as DMA engine 320, to fetch the local data.

In step 710, the controller (e.g., DMA engine 320) also fetches the remote data from the local off-chip memory.

In step 712, the controller generates, based on the local data and the remote data, output data targeted at the second device. In some examples, the DMA engine can implement an all-reduce operation to combine the local weight gradients and the partial averaged weight gradients to generate updated partial averaged weight gradients and to transmit the updated partial averaged weight gradients to the second device. In a case where the second device is a network adapter, the network adapter can transmit the updated partial averaged weight gradients to another worker node in the ring topology, which can perform a backward propagation operation to further update the partial averaged weight gradients. In a case where the second device is a second hardware data processor, the second hardware data processor can also perform a backward propagation operation to further update the partial averaged weight gradients.

In step 714, the controller (e.g., DMA engine 320) stores, via the interconnect, the output data at a local memory (e.g., local memory 326 of network adapter 308 or local off-chip memory 316 of hardware data processor 306b). The storage of the output data at the local memory of the second device allows the second device to fetch the output data from its local memory for transmission over the network, or as an input to a computation operation (e.g., backward propagation operation) at the second device.

In some examples, DMA engine 320 can store the output data via the interconnect by generating memory write requests that point to a base address of local memory 326 of network adapter 308. Specifically, controller 318 of hardware data processor 306 can have access to the base address of local memory 326 of network adapter 308. In a case where interconnect 310 implements a PCIE root-complex, the base address can be accessible from, for example, a Base Address Register (BAR) of the PCIE root-complex. The base address can point to a pre-determined memory region of local memory 326 and can be allocated and accessible only to data processor 306 for writing data into, such that the BAR register storing the base address is accessible by only controller 318 and a management entity (e.g., a host processor, a hypervisor, and a management server).

After generating the memory write requests, DMA engine 320 can transmit the output data and the memory write requests to the second device. The output data may be buffered at an internal buffer of interconnect 310. Controller 318 may also transmit a notification, such as notification 502, to the second device, which causes the second device to perform a flush operation by fetching all the output data buffered in interconnect 310. Interconnect 310 may also implement a flow control mechanism to delay the transmission of output data by DMA engine 320 until the local memory of the second device has capacity to store the output data.

Figure 8:
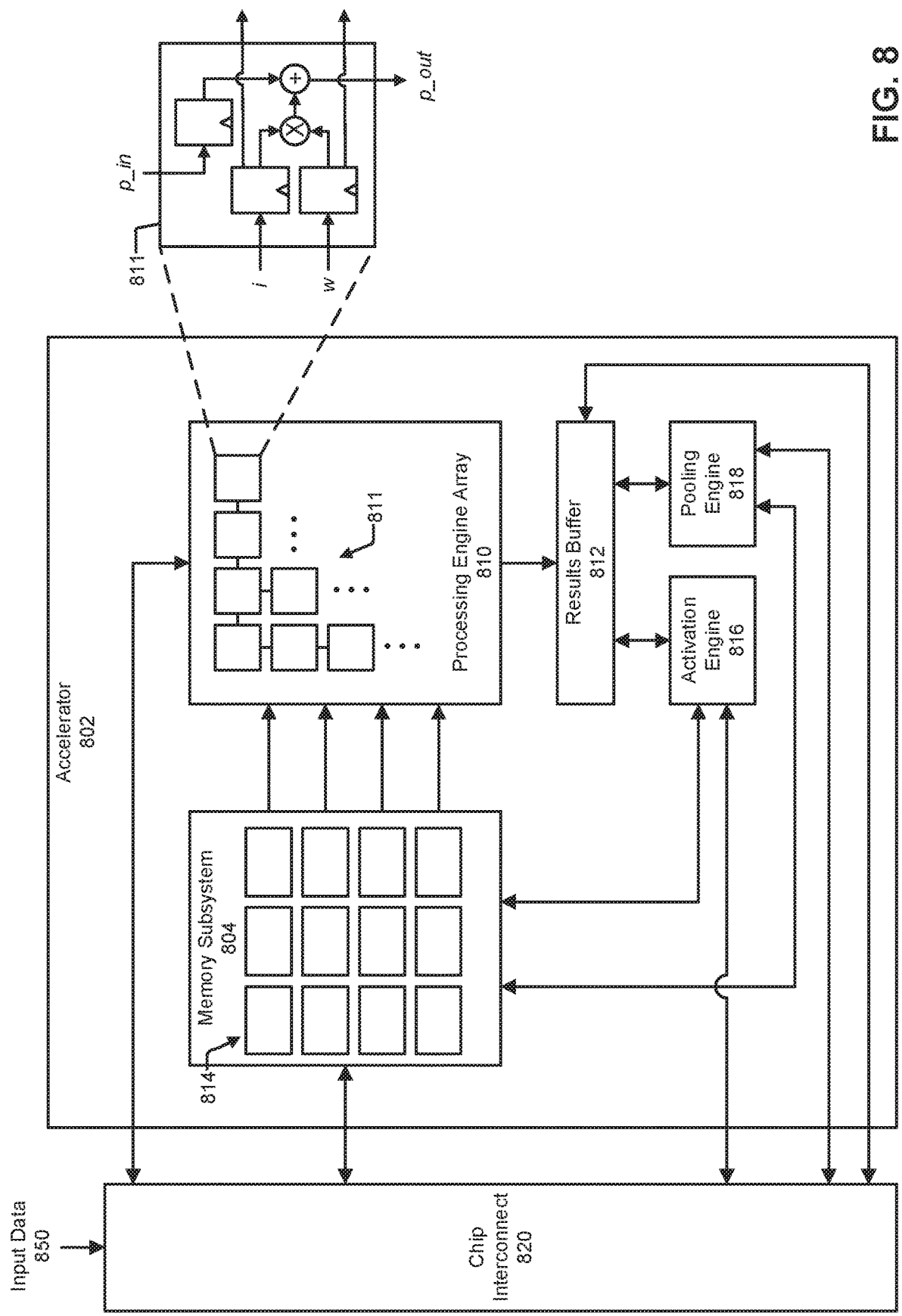
FIG. 8 illustrates an example of an acceleration engine that can be part of the computing server of FIG. 3A and FIG. 6A.

FIG. 8 is a block diagram illustrating an example of an integrated circuit device that can include hardware data processor 306. The example of FIG. 8 illustrates an accelerator 802. In various examples, the accelerator 802, for a set of input data (e.g., input data 850), can execute computations using a processing engine array 810, an activation engine 816, and/or a pooling engine 818. In some examples, the example accelerator 802 may be an integrated circuit component of a processor, such as a neural network processor. The processor may have other integrated circuit components, including additional accelerator engines.

In various implementations, the memory subsystem 804 can include multiple memory banks 814. In these implementations, each memory bank 814 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 814. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 804 can permit simultaneous access to the read or write channels of multiple memory banks. As another example, the memory subsystem 804 can include arbitration logic such that arbitration between, for example, the outputs of multiple memory banks 814 can result in more than one memory bank's output being used. In these and other examples, though globally managed by the memory subsystem 804, each memory bank can be operated independently of any other.

Having the memory banks 814 be independently accessible can increase the efficiency of the accelerator 802. For example, values can be simultaneously read and provided to each row of the processing engine array 810, so that the entire processing engine array 810 can be in use in one clock cycle. As another example, the memory banks 814 can be read at the same time that results computed by the processing engine array 810 are written to the memory subsystem 804. In contrast, a single memory may be able to service only one read or write at a time. With a single memory, multiple clock cycles can be required, for example, to read input data for each row of the processing engine array 810 before the processing engine array 810 can be started.

In various implementations, the memory subsystem 804 can be configured to simultaneously service multiple clients, including the processing engine array 810, the activation engine 816, the pooling engine 818, and any external clients that access the memory subsystem 804 over a communication fabric 820. In some implementations, being able to service multiple clients can mean that the memory subsystem 804 has at least as many memory banks as there are clients. In some cases, each row of the processing engine array 810 can count as a separate client. In some cases, each column of the processing engine array 810 can output a result, such that each column can count as a separate write client. In some cases, output from the processing engine array 810 can be written into the memory banks 814 that can then subsequently provide input data for the processing engine array 810. As another example, the activation engine 816 and the pooling engine 818 can include multiple execution channels, each of which can be separate memory clients. The memory banks 814 can be implemented, for example, using static random access memory (SRAM).

In various implementations, the memory subsystem 804 can include control logic. The control logic can, for example, keep track of the address spaces of each of the memory banks 814, identify memory banks 814 to read from or write to, and/or move data between the memory banks 814. In some implementations, memory banks 814 can be hardwired to particular clients. For example, a set of memory banks 814 can be hardwired to provide values to the rows of the processing engine array 810, with one memory bank servicing each row. As another example, a set of memory banks can be hard wired to receive values from columns of the processing engine array 810, with one memory bank receiving data for each column.

The processing engine array 810 is the computation matrix of the example accelerator 802. The processing engine array 810 can, for example, execute parallel integration, convolution, correlation, and/or matrix multiplication, among other things. The processing engine array 810 includes multiple processing engines 811, arranged in rows and columns, such that results output by one processing engine 811 can be input directly into another processing engine 811. Processing engines 811 that are not on the outside edges of the processing engine array 810 thus can receive data to operate on from other processing engines 811, rather than from the memory subsystem 804.

In various examples, the processing engine array 810 uses systolic execution, in which data arrives at each processing engine 811 from different directions at regular intervals. In some examples, input data can flow into the processing engine array 810 from the left and weight values can be loaded at the top. In some examples weights and input data can flow from the left and partial sums can flow from top to bottom. In these and other examples, a multiply-and-accumulate operation moves through the processing engine array 810 as a diagonal wave front, with data moving to the right and down across the array. Control signals can be input at the left at the same time as weights, and can flow across and down along with the computation.

In various implementations, the number of columns in the processing engine array 810 determines the computational capacity of the processing engine array 810, and the number of rows determines the required memory bandwidth for achieving maximum utilization of the processing engine array 810. The processing engine array 810 can have, for example, 64 columns and 428 rows, or some other number of columns and rows.

An example of a processing engine 811 is illustrated in FIG. 8 in an inset diagram. As illustrated by this example, a processing engine 811 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 811.

In the illustrated example, an input from above can include a partial sum, pin, provided either from another processing engine 811 or from a previous round of computation by the processing engine array 810. When starting a computation for a new set of input data, the top row of the processing engine array 810 can receive a fixed value for p_in, such as zero. As illustrated by this example, i and w are multiplied together and the result is summed with p_in to produce a new partial sum, p_out, which can be input into another processing engine 811. Various other implementations of the processing engine 811 are possible.

Outputs from the last row in the processing engine array 810 can be temporarily stored in the results buffer 812. The results can be intermediate results, which can be written to the memory banks 814 to be provided to the processing engine array 810 for additional computation. Alternatively, the results can be final results, which, once written to the memory banks 814 can be read from the memory subsystem 804 over the communication fabric 820, to be output by the system.

In some implementations, the accelerator 802 includes an activation engine 816. In these implementations, the activation engine 816 can combine the results from the processing engine array 810 into one or more output activations. For example, for a convolutional neural network, convolutions from multiple channels can be summed to produce an output activation for a single channel. In other examples, accumulating results from one or more columns in the processing engine array 810 may be needed to produce an output activation for a single node in the neural network. In some examples, activation engine 816 can be bypassed.

In various examples, the activation engine 816 can include multiple separate execution channels. In these examples, the execution channels can correspond to the columns of the processing engine array 810, and can perform an operation on the outputs of a column, the result of which can be stored in the memory subsystem 804. In these examples, the activation engine 816 may be able to perform between 1 and n parallel computations, where n is equal to the number of columns in the processing engine array 810. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 802 can include a pooling engine 818. Pooling is the combining of outputs of the columns of the processing engine array 810. Combining can include for example, computing a maximum value, a minimum value, an average value, a median value, a summation, a multiplication, or another logical or mathematical combination. In various examples, the pooling engine 818 can include multiple execution channels that can operating on values from corresponding columns of the processing engine array 810. In these examples, the pooling engine 818 may be able to perform between 1 and n parallel computations, where n is equal to the number of columns in the processing engine array 810. In various examples, execution channels of the pooling engine 818 can operate in parallel and/or simultaneously. In some examples, the pooling engine 818 can be bypassed.

Herein, the activation engine 816 and the pooling engine 818 may be referred to collectively as execution engines. The processing engine array 810 is another example of an execution engine. Another example of an execution engine is a Direct Memory Access (DMA) engine, which may be located outside the accelerator 802.

Input data 850 can arrive over the communication fabric 820. The communication fabric 820 can connect the accelerator 802 to other components of a processor, such as a DMA engine that can obtain input data 850 from an Input/Output (I/O) device, a storage drive, or a network interface. The input data 850 can be, for example one-dimensional data, such as a character string or numerical sequence, or two-dimensional data, such as an array of pixel values for an image or frequency and amplitude values over time for an audio signal. In some examples, the input data 850 can be three-dimensional, as may be the case with, for example, the situational information used by a self-driving car or virtual reality data. In some implementations, the memory subsystem 804 can include a separate buffer for the input data 850. In some implementations, the input data 850 can be stored in the memory banks 814 when the accelerator 802 receives the input data 850.

In some examples, the accelerator 802 can implement a neural network processing engine. In these examples, the accelerator 802, for a set of input data 850, can execute a neural network to perform a task for which the neural network was trained. Executing a neural network on a set of input data can be referred to as inference or performing inference.

The weights for the neural network can be stored in the memory subsystem 804, along with input data 850 on which the neural network will operate. The neural network can also include instructions, which can program the processing engine array 810 to perform various computations on the weights and the input data. The instructions can also be stored in the memory subsystem 804, in the memory banks 814 or in a separate instruction buffer. The processing engine array 810 can output intermediate results, which represent the outputs of individual layers of the neural network. In some cases, the activation engine 816 and/or pooling engine 818 may be enabled for computations called for by certain layers of the neural network. The accelerator 802 can store the intermediate results in the memory subsystem 804 for inputting into the processing engine array 810 to compute results for the next layer of the neural network. The processing engine array 810 can further output final results from a last layer of the neural network. The final results can be stored in the memory subsystem 804 and then be copied out to host processor memory or to another location.

Figure 9:
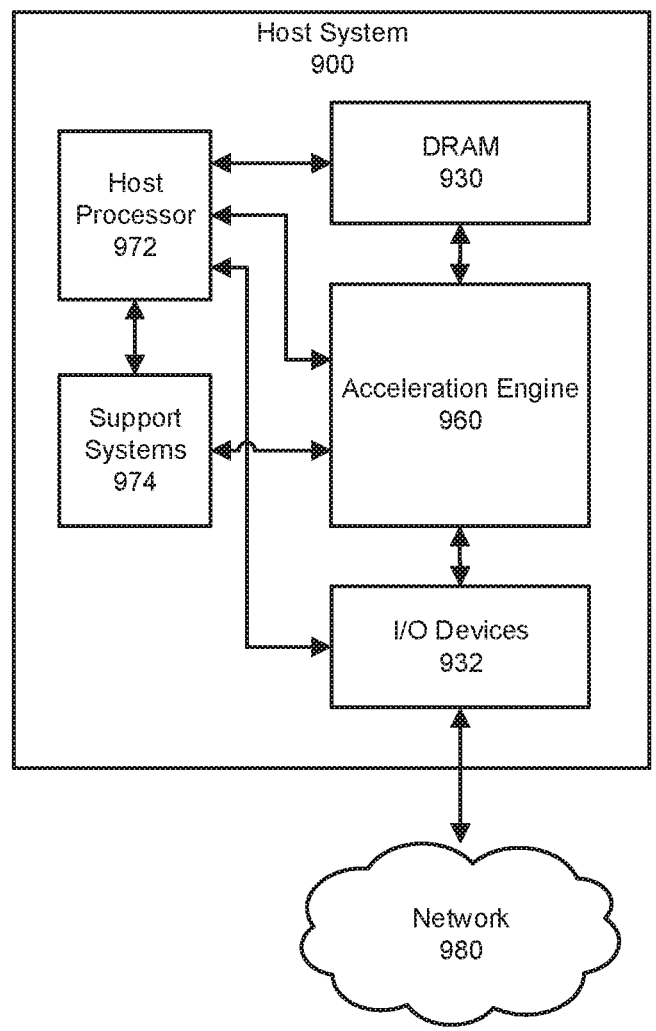
FIG. 9 illustrates an example of a host system that can be part of the computing server of FIG. 3A and FIG. 6A.

FIG. 9 includes a block diagram that illustrates an example of a host system 900, in which an acceleration engine 960 can be used. The acceleration engine 960 of FIG. 9 is an example of a device that can include one or more accelerators, as illustrated in FIG. 8. The example host system 900 of FIG. 9 includes the acceleration engine 960, a host processor 972, DRAM 930 or processor memory, I/O devices 932, and support systems 974. In various implementations, the host system 900 can include other hardware that is not illustrated here.

The host processor 972 is a general purpose integrated circuit that is capable of executing program instructions. In some examples, the host processor 972 can include multiple processing cores. A multi-core processor may include multiple processing units within the same processor. In some examples, the host system 900 can include more than one host processor 972. In some examples, the host processor 972 and the acceleration engine 960 can be one chip, such as one or more integrated circuits within the same package.

In various examples, the host processor 972 can communicate with other components in the host system 900 over one or more communication channels. For example, the host system 900 can include a host processor bus, which the host processor 972 can use to communicate with the DRAM 930, for example. As another example, the host system 900 can include an I/O bus, such as a PCI-based bus, over which the host processor 972 can communicate with the acceleration engine 960 and/or the I/O devices 932. In various examples, the host system 900 can, alternatively or additionally, include other communication channels or busses, such as serial busses, power management busses, storage device busses, and so on.

In some examples, software programs executing on the host processor 972 can receive or generate input for processing by the acceleration engine 960. In some examples, the programs can select an appropriate neural network to execute for a given input. For example, a program may be for language translation and can select one or more neural networks capable of speech recognition and/or machine translation. In these and other examples, the programs can configure the acceleration engine 960 with the neural network to execute and/or can select a neural network processing engine on the acceleration engine 960 that has previously been configured to execute the desired neural network. In some examples, once the acceleration engine 960 has started an inference on input data, the host processor 972 can manage the movement of data (such as weights, instructions, intermediate results, results of conditional layers, and/or final results) into or out of the acceleration engine 960.

In some examples, a software program that is using the acceleration engine 960 to conduct an inference can read the result from a conditional layer from the acceleration engine 960 and/or from a storage location, such as in DRAM 930. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 930 is memory that is used by the host processor 972 for storage of program code that the host processor 972 is in the process of executing, as well as values that are being operated on. In some examples, the data for a neural network (e.g., weight values, instructions, and other data) can be all or partially stored in the DRAM 930. DRAM is a common term for processor memory, and though DRAM is volatile memory, processor memory can be volatile and/or non-volatile. Though not illustrated here, the host system 900 can include other volatile and non-volatile memories for other purposes. For example, the host system 900 can include a Read-Only Memory (ROM) that stores boot code for booting the host system 900 at power on, and/or Basic Input/Output System (BIOS) code.

Though not illustrated here, the DRAM 930 can store instructions for various programs, which can be loaded into and be executed by the host processor 972. For example, the DRAM 930 can store instructions for an operating system, one or more data stores, one or more application programs, one or more drivers, and/or services for implementing the features disclosed herein.

The operating system can manage and orchestrate the overall operation of the host system 900, such as scheduling tasks, executing applications, and/or controller peripheral devices, among other operations. In some examples, a host system 900 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 900. For example, some drivers can provide communication between the operating system and peripheral devices or I/O devices 932. Alternatively or additionally, some drivers may provide communication between application programs and the operating system and/or application programs and peripheral devices accessible to the host system 900. In many cases, the drivers can include drivers that provide well-understood functionality (e.g., printer drivers, display drivers, hard disk drivers, Solid State Device drivers). In other cases, the drivers may provide proprietary or specialized functionality.

The I/O devices 932 can include hardware for connecting to user input and output devices, such as keyboards, mice, pens, tablets, voice input devices, touch input devices, displays or monitors, speakers, and printers, among other devices. The I/O devices 932 can also include storage drives and/or network interfaces for connecting to a network 980. For example, the host system 900 can use a network interface to communicate with storage devices, user terminals, other computing devices or servers, and/or other networks, among various examples.

In various examples, one or more of the I/O devices 932 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 900 or may be in an external enclosure. A storage device can be fixed (e.g., attached by screws) or removable (e.g., having a physical release mechanism and possibly a hot-plug mechanism).

Storage devices, the DRAM 930, and any other memory component in the host system 900 are examples of computer-readable storage media. Computer-readable storage media are physical mediums that are capable of storing data in a format that can be read by a device, such as the host processor 972. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 932 can be PCI-based devices. In these examples, a PCI-based I/O device includes a PCI interface for communicating with the host system 900. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., 64 network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 974 can include hardware for coordinating the operations of the acceleration engine 960. For example, the support systems 974 can include a microprocessor that coordinates the activities of the acceleration engine 960, including moving data around on the acceleration engine 960. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 972. In some examples, the program executed by the microprocessor is stored on the hardware of microprocessor or on a non-volatile memory chip in the host system 900. In some examples, the microprocessor and the acceleration engine 960 can be on chip, such as one integrated circuit on the same die and in the same package.

In some examples, the support systems 974 can be responsible for taking instructions from the host processor 972 when programs executing on the host processor 972 request the execution of a neural network. For example, the host processor 972 can provide the support systems 974 with a set of input data and a task that is to be performed on the set of input data. In this example, the support systems 974 can identify a neural network that can perform the task, and can program the acceleration engine 960 to execute the neural network on the set of input data. In some examples, the support systems 974 only needs to select an appropriate neural network processing engine of the neural network processor. In some examples, the support systems 974 may need to load the data for the neural network onto the acceleration engine 960 before the acceleration engine 960 can start executing the neural network. In these and other examples, the support systems 974 can further receive the output of executing the neural network, and provide the output back to the host processor 972.

In some examples, the operations of the support systems 974 can be handled by the host processor 972. In these examples, the support systems 974 may not be needed and can be omitted from the host system 900.

In various examples, the host system 900 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, or a gaming console. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 900 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing, or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, and/or a gaming console. In some instances, the service provider computer may communicate with one or more third party computers.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer server, comprising:
   a host processor;
   a network adapter coupled with a network, the network adapter comprising a local memory;
   a hardware data processor comprising a local on-chip memory, a local off-chip memory configured to store partial averaged weight gradients, a computation engine, and a direct memory access (DMA) engine; and
   an interconnect coupled between the host processor, the network adapter, and the hardware data processor;
   wherein the hardware data processor is configured to:
      based on a command from the host processor, perform, using the computation engine, a backward propagation operation to generate local weight gradients;
      store the local weight gradients at the local on-chip memory;
      control the DMA engine to:
         fetch the local weight gradients from the local on-chip memory of the hardware data processor;
         fetch the partial averaged weight gradients from the local off-chip memory of the hardware data processor;
         perform an all-reduce operation on the local weight gradients and the partial averaged weight gradients to generate updated partial averaged weight gradients; and store, via the interconnect, the updated partial averaged weight gradients at the local memory of the network adapter; and wherein the network adapter is configured to:
fetch the updated partial averaged weight gradients from the local memory;
generate packets including the updated partial averaged weight gradients; and
transmit the packets to the network.

2. The computer server of claim 1, wherein the hardware data processor is configured to:
obtain a base address of the local memory of the network adapter from a base address register (BAR) of the interconnect;
generate memory write instructions including destination addresses based on the base address; and
transmit the memory write instructions and the updated partial averaged weight gradients to the network adapter via the interconnect, to enable a memory controller of the network adapter to store the updated partial averaged weight gradients at the local memory of the network adapter based on the memory write instructions.

3. The computer server of claim 1, wherein the computer server is configured as a first node in a ring topology; and
wherein the packets including the updated partial averaged weight gradients are transmitted to a second node in the ring topology as an input to the all-reduce operation.

4. The computer server of claim 1, wherein the local weight gradients and partial averaged weight gradients are, respectively, first local weight gradients and first partial averaged weight gradients; and
wherein the hardware data processor is configured to:
control the DMA engine to:
fetch second local weight gradients and second partial averaged weight gradients from, respectively, the local on-chip memory and the local off-chip memory;
perform the all-reduce operation on the second local weight gradients and the second partial averaged weight gradients to generate final averaged weight gradients;
store the final averaged weight gradients at the off-chip local memory of the hardware data processor; and
transmit a notification to the network adapter that the final averaged weight gradients are stored at the off-chip local memory of the hardware data processor; and
control the computing engine to update weights of a neural network model based on the final averaged weight gradients; and
wherein the network adapter is configured to, responsive to receiving the notification, transmit read descriptors to the DMA engine of the hardware data processor via the interconnect to fetch the final averaged weight gradients from the off-chip local memory of the hardware data processor.

5. An apparatus comprising:
a local on-chip memory;
a computation engine configured to generate local data and to store the local data at the local on-chip memory; and
a controller;

wherein the apparatus is configured to be coupled with a network adapter separate from the apparatus via an interconnect, the network adapter comprising a local memory; and wherein the controller is configured to:
fetch the local data from the local on-chip memory;
fetch remote data generated by another device from a local off-chip memory;
generate output data based on combining the local data and the remote data; and
store, via the interconnect, the output data at the local memory of the network adapter.

6. The apparatus of claim 5, wherein the controller is configured to:
obtain a base address of the local memory of the network adapter from a base address register (BAR) of the interconnect;
generate memory write instructions including destination addresses based on the base address; and
transmit the memory write instructions and the output data to the network adapter via the interconnect, to enable a memory controller of the network adapter to store the output data at the local memory of the network adapter based on the memory write instructions.

7. The apparatus of claim 6, wherein the controller is configured to transmit a notification to the network adapter to indicate when a transfer of the output data to the interconnect completes; and
wherein the notification causes the network adapter second device to perform a flush operation to fetch all of the output data stored in an internal buffer of the interconnect to the local memory of the network adapter.

8. The apparatus of claim 6, wherein the BAR is accessible only by the controller and a management entity.

9. The apparatus of claim 5, wherein the interconnect is configured to accept the output data based on an indication that the local memory of the network adapter has capacity available to store the output data.

10. The apparatus of claim 5, wherein the local data, the remote data, and the output data are, respectively, first local data, first remote data, and first output data;
wherein the computation engine is configured to generate second local data and store the second local data at the local on-chip memory;
wherein the local off-chip memory is configured to store second remote data; and
wherein the controller is configured to:
fetch the second local data from the local on-chip memory;
fetch the second remote data from the local off-chip memory;
generate second output data based on combining the second local data and the second remote data;
store the second output data at the local off-chip memory;
receive read requests from the network adapter; and
based on the read requests, fetch the second output data from the local off-chip memory to the network adapter.

11. The apparatus of claim 10, wherein the controller is configured to:
fetch the second output data from the local off-chip memory to the local on-chip memory; and
wherein the computation engine is configured to:
fetch the second output data from the local on-chip memory; and perform a computation operation on the second output data.

12. The apparatus of claim 5, wherein the controller further comprises a DMA engine configured to generate the output data based on combining the local data and the remote data, and to generate the memory write instructions.

13. The apparatus of claim 5,
wherein the storage of the output data at the local memory of the network adapter enables the network adapter to fetch the output data from the local memory and to generate packets including the output data for transmission to a network.

14. The apparatus of claim 5,
wherein the output data is first output data;
wherein the local data is first local data;
wherein the network adapter comprises a computation engine and a controller;
where the storage of the first output data at the local memory of the network adapter enables the controller of the network adapter to fetch the first output data from the local memory and to generate second output data based on combining the first output data with second local data generated by the controller of the network adapter.

15. The apparatus of claim 5, wherein the computation engine comprises a neural network processor configured to perform a backward propagation operation to generate local weight gradients as the local data;
wherein the remote data comprises partial averaged weight gradients received from another worker node;
wherein the controller is configured to perform an all reduce operation to average the local weight gradients and the partial averaged weight gradients to generate updated partial averaged weight gradients as the output data.

16. The apparatus of claim 5, wherein the interconnect comprises at least one of: a Peripheral Component Interconnect Express (PCIE) root-complex switch, or a PCIE peer-to-peer link.

17. The apparatus of claim 5, wherein the local on-chip memory comprises at least one of: a static random access memory (SRAM), registers, or flops; and wherein the local off-chip memory comprises at least one of: a dynamic random access memory (DRAM), a high-bandwidth memory (HBM), a storage class memory (SCM), or a flash memory.

18. A method comprising:
storing remote data at a local off-chip memory of a hardware data processor, the remote data being received from another device;
generating local data using a computation engine of the hardware data processor;
storing, by the computation engine, the local data at a local on-chip memory of the hardware data processor;
fetching, by a controller of the hardware data processor, the local data from the local on-chip memory;
fetching, by the controller, the remote data from the local off-chip memory;
generating, by the controller and based on the local data and the remote data, output data targeted at a network adapter, the network adapter being separate from the hardware data processor and being coupled with the hardware data processor via an interconnect; and
storing, via the interconnect, the output data at a local memory of the network adapter.

19. The method of claim 18, further comprising:
obtaining a base address of the local memory of the network adapter from a base address register (BAR) of the interconnect;
generating memory write instructions including destination addresses based on the base address; and
transmitting the memory write instructions and the output data to the network adapter via the interconnect, to enable a memory controller of the network adapter to store the output data at the local memory of the network adapter based on the memory write instructions.

20. The method of claim 19, wherein the controller comprises a DMA engine configured to generate the output data based on combining the local data and the remote data, and to generate the memory write instructions.

* * * * *